(12) United States Patent
Kim et al.

(10) Patent No.: US 11,870,995 B2
(45) Date of Patent: *Jan. 9, 2024

(54) METHOD AND DEVICE FOR PROCESSING VIDEO SIGNAL BY USING CROSS-COMPONENT LINEAR MODEL

(71) Applicant: SAMSUNG ELECTRONICS CO., LTD., Suwon-si (KR)

(72) Inventors: Dongcheol Kim, Suwon-Si (KR); Geonjung Ko, Seoul (KR); Jaehong Jung, Seoul (KR); Juhyung Son, Uiwang-Si (KR); Jinsam Kwak, Anyang-Si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,809

(22) Filed: Jul. 21, 2022

(65) Prior Publication Data
US 2022/0360786 A1 Nov. 10, 2022

Related U.S. Application Data

(63) Continuation of application No. 17/282,745, filed as application No. PCT/KR2019/013449 on Oct. 14, 2019, now Pat. No. 11,438,596.

(30) Foreign Application Priority Data

Oct. 12, 2018 (KR) .................. 10-2018-0121530
Oct. 23, 2018 (KR) .................. 10-2018-0126681
Dec. 31, 2018 (KR) .................. 10-2018-0174327

(51) Int. Cl.
*H04N 19/00* (2014.01)
*H04N 19/132* (2014.01)
(Continued)

(52) U.S. Cl.
CPC ......... *H04N 19/132* (2014.11); *H04N 19/105* (2014.11); *H04N 19/176* (2014.11); *H04N 19/186* (2014.11)

(58) Field of Classification Search
CPC .. H04N 19/132; H04N 19/105; H04N 19/186; H04N 19/176
See application file for complete search history.

(56) References Cited

U.S. PATENT DOCUMENTS 10,419,754 B1    9/2019  Zhao et al.
11,632,559 B2    4/2023  Chen et al.
(Continued)

FOREIGN PATENT DOCUMENTS

CN    103096057 A    5/2013
CN    103167295 A    6/2013
(Continued)

OTHER PUBLICATIONS

"CE3-5.1: On cross-component linear model simplification". Joint Video Experts Team (JVET) of ITU-T SG 16 WP 3 and ISO/IEC JTC 1/SC 29/WG 11 12th Meeting: Macao, CN, Oct. 3-12, 2018. Document: JVET-L0191.
(Continued)

*Primary Examiner* — Zhihan Zhou
(74) *Attorney, Agent, or Firm* — Sughrue Mion, PLLC

(57) ABSTRACT

The video signal processing method comprises the steps of: downsampling luma components of reconstructed blocks adjacent to a current block; acquiring a maximum luma value from among the downsampled luma components based on a first index; acquiring a next-highest maximum luma value from among the downsampled luma components based on a second index; acquiring a maximum average luma value based on an average value of the maximum luma value and the next-highest maximum luma value; acquiring
(Continued)

a next-lowest minimum luma value from among the downsampled luma components based on a third index; acquiring a minimum luma value from among the downsampled luma components based on a fourth index; and acquiring a minimum average luma value based on the next-lowest minimum luma value and the minimum luma value.

8 Claims, 15 Drawing Sheets

(51) Int. Cl.
   *H04N 19/105*    (2014.01)
   *H04N 19/176*    (2014.01)
   *H04N 19/186*    (2014.01)

(56) References Cited

U.S. PATENT DOCUMENTS

| | | |
|---|---|---|
| 2013/0051469 A1 | 2/2013 | Park et al. |
| 2013/0136174 A1 | 5/2013 | Xu et al. |
| 2013/0156311 A1 | 6/2013 | Choi et al. |
| 2013/0188696 A1 | 7/2013 | Liu |
| 2016/0165253 A1 | 6/2016 | Lee et al. |
| 2017/0272748 A1 | 9/2017 | Seregin et al. |
| 2017/0359595 A1 | 12/2017 | Zhang et al. |
| 2018/0063527 A1 | 3/2018 | Chen et al. |
| 2020/0389650 A1* | 12/2020 | Laroche ............... H04N 19/132 |
| 2020/0413062 A1* | 12/2020 | Onno .................... H04N 19/156 |
| 2021/0136392 A1* | 5/2021 | Ma ......................... H04N 19/186 |
| 2021/0136409 A1* | 5/2021 | Ma ......................... H04N 19/176 |
| 2021/0227235 A1* | 7/2021 | Chen .................... H04N 19/176 |
| 2021/0227240 A1* | 7/2021 | Chen .................... H04N 19/132 |
| 2022/0060720 A1 | 2/2022 | Lee |

FOREIGN PATENT DOCUMENTS

| | | |
|---|---|---|
| CN | 103650512 A | 3/2014 |
| CN | 104255033 A | 12/2014 |
| CN | 107277514 A | 10/2017 |
| GB | 2567249 A | 4/2019 |
| KR | 10-1501642 B1 | 3/2010 |
| KR | 10-2013-0045152 A | 5/2013 |
| KR | 10-2014-0029525 A | 3/2014 |
| KR | 10-1588144 B1 | 3/2014 |
| KR | 10-2014-0071429 A | 6/2014 |
| KR | 10-2017-0071594 A | 6/2017 |
| KR | 1020180001478 A | 1/2018 |
| KR | 10-2018-0014109 A | 2/2018 |
| KR | 10-2018-0110201 A | 10/2018 |
| KR | 10-2021-0045497 A | 4/2021 |
| WO | 2013/067687 A1 | 5/2013 |
| WO | 2016198169 A1 | 12/2016 |
| WO | 2017190288 A1 | 11/2017 |
| WO | 2018-012808 A1 | 1/2018 |
| WO | 2019162116 A1 | 8/2019 |
| WO | 2020076036 A1 | 4/2020 |
| WO | 2020141598 A1 | 7/2020 |

OTHER PUBLICATIONS

Examination report under sections 12 & 13 of the Patents Act, 1970 and the Patents Rules, 2003 for Application No. 202127016362 from Intellectual Property of India. dated Oct. 2, 2022.
Examination report under sections 12 & 13 of the Patents Act, 1970 and the Patents Rules, 2003 for Application No. 202127016390 from Intellectual Property of India. dated Feb. 14, 2022.
"Non-CE3: A unified luma intra mode list construction process". Joint Video Experts Team (JVET) of ITU-T SG 16 WP 3 and ISO/IEC JTC 1/SC 29/WG 11 13th Meeting: Marrakech, MA, Jan. 9-18, 2019. Document: JVET-M0528. JVET-M0528-xlsm(ExcelChart).
"Non-CE3: A unified luma intra mode list construction process". Joint Video Experts Team (JVET) of ITU-T SG 16 WP 3 and ISO/IEC JTC 1/SC 29/WG 11 13th Meeting: Marrakech, MA, Jan. 9-18, 2019. Document: JVET-M0528_r1. JVET-M0528-additional-encoder-only-changes_xlsm(ExcelChart).
JVET-M0528_Modification to VVC WD.
JVET-M0210_Test1_xslm (Excel Chart).
JVET-M0210_Test2_xslm (Excel Chart).
JVET-M0210_Test3_xslm (Excel Chart).
"Non-CE3: Intra prediction information coding". Joint Video Experts Team (JVET) of ITU-T SG 16 WP 3 and ISO/IEC JTC 1/SC 29/WG 11 13th Meeting: Marrakech, MA, Jan. 9-18, 2019. Document: JVET-M0210_v1.
"JVET-M0210 Non-CE3: Intra prediction information coding" Fujitsu 13thJVET Meeting: Marrakech, MA, Jan. 9-18, 2019 (PPT).
"Non-CE3: Intra prediction information coding". Joint Video Experts Team (JVET) of ITU-T SG 16 WP 3 and ISO/IEC JTC 1/SC 29/WG 11 13th Meeting: Marrakech, MA, Jan. 9-18, 2019. Document: JVET-M0210_v2(r1) (mark-up).
"Non-CE3: Intra prediction information coding". Joint Video Experts Team (JVET) of ITU-T SG 16 WP 3 and ISO/IEC JTC 1/SC 29/WG 11 13th Meeting: Marrakech, MA, Jan. 9-18, 2019. Document: JVET-M0210_v3(r2) (mark-up).
JVET-M0210_VVC_Draft_Text_Jan. 6, 2019.
International Search Report of International application No. PCT/KR2019/013137. dated Jan. 17, 2020.
English Translation of Written Opinion of International application No. PCT/KR2019/013137. dated Jan. 17, 2020.
English Translation of Written Opinion of International application No. PCT/KR2019/013449. dated Feb. 14, 2020.
"CE3-related: Advanced MPM based on intra reference line selection scheme". Joint Video Experts Team (JVET) of ITU-T SG 16 WP 3 and ISO/IEC JTC 1/SC 29/WG 11 11th Meeting: Ljubljana, SI, Jul. 10-18, 2018 Document: JVET-K0175-v3.
International Search Report & Written Opinion of the International Searching Authoriity_PCT/KR2019/013449_dated Feb. 14, 2020.
Non-Final Rejection of U.S. Appl. No. 17/223,419 from the USPTO dated May 18, 2022.
Non-Final Rejection of U.S. Appl. No. 17/282,745 from the USPTO dated Feb. 4, 2022.
Notice of Allowance of U.S. Appl. No. 17/282,745 from the USPTO dated Jun. 10, 2022.
Non-Final Rejection of U.S. Appl. No. 17/233,419 from the USPTO dated May 18, 2022.
Communication issued by the Korean Intellectual Property Office dated Mar. 29, 2023 for Korean Patent Application No. 10-2021-7012535.
Communication dated Jul. 6, 2023, issued by the National Intellectual Property Administration, PRC in counterpart Chinese Application No. 201980066770.7.
Venugopal et al., "CE8 related: Intra Region-based Template Matching for luma and chroma," Joint Video Experts Team (JVET) of ITU-T SG 16 WP 3 and ISO/IEC JTC 1/SC 29/WG 11, JVET-K0050-v1, Jul. 2018, Total 5 pages.

* cited by examiner (a) Application example 2 of CCLM filter when MRL is used (b) Application example 3 of CCLM filter when MRL is used (a) Application example 4 of CCLM filter when MRL is used (b) Application example 5 of CCLM filter when MRL is used Locations of the samples used for
the derivation of α and β

(a)

(b)

(c)

| intra_chroma_pred_mode [ xCb ][ yCb ] | IntraPredModeY[ xCb + cbWidth / 2 ][ yCb + cbHeight / 2 ] | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

(a) Specification of IntraPredModeC[ xCb ][ yCb ] depending on intra_chroma_pred_mode[ xCb ][ yCb ] and IntraPredModeY[ xCb + cbWidth / 2 ][ yCb + cbHeight / 2 ] when sps_cclm_enabled_flag is equal to 1

| Value of intra_chroma_pred_mode | Bin string |
|---|---|
| 7 | 0 |
| 4 | 10 |
| 5 | 1110 |
| 6 | 1111 |
| 0 | 11000 |
| 1 | 11001 |
| 2 | 11010 |
| 3 | 11011 |

(b) Binarization of Intra_chroma_pred_mode when sps_cclm_enabled_flag is equal to 1

*FIG. 18*

METHOD AND DEVICE FOR PROCESSING VIDEO SIGNAL BY USING CROSS-COMPONENT LINEAR MODEL

CROSS-REFERENCE TO RELATED APPLICATIONS

This application is a continuation of U.S. application Ser. No. 17/282,745, which was filed on Apr. 2, 2021, and which is a National Stage Entry of PCT International Application No. PCT/KR2019/013449, which was filed on Oct. 14, 2019, and which claims priority from and the benefit of Korean Patent Application 10-2018-0121530, filed with the Korean Intellectual Property Office on Oct. 12, 2018, Korean Patent Application 10-2018-0126681, filed with the Korean Intellectual Property Office on Oct. 23, 2018, and Korean Patent Application 10-2018-0174327, filed with the Korean Intellectual Property Office on Dec. 31, 2018, the disclosure of which are hereby incorporated by reference in its entirety.

TECHNICAL FIELD

The present disclosure relates to a method and an apparatus for processing a video signal and, more particularly, to a video signal processing method and apparatus for encoding and decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE

Technical Problem

An aspect of the present invention is to increase coding efficiency of a video signal. Specifically, the aspect of the present invention is to increase encoding or decoding efficiency by predicting chroma components based on luma components of a reconstructed current block.

Technical Solution

In order to solve the problem, the present invention provides a video signal processing apparatus and a video signal processing method.

A method of processing a video signal according to the present disclosure includes: down-sampling reconstructed luma components of a block adjacent to a current block; acquiring a maximum luma value among the down-sampled luma components, based on a first index; acquiring a next highest luma value among the down-sampled luma components, based on a second index; acquiring a maximum luma average value, based on an average value of the maximum luma value and the next highest luma value; acquiring a next lowest luma value among the down-sampled luma components, based on a third index; acquiring a minimum luma value among the down-sampled luma components, based on a fourth index; acquiring a minimum luma average value, based on the next lowest luma value and the minimum luma value; acquiring a first chroma value among chroma components corresponding to the down-sampled luma components, based on the first index; acquiring a second chroma value among the chroma components, based on the second index; acquiring a maximum chroma average value, based on an average value of the first chroma value and the second chroma value; acquiring a third chroma value among the chroma components, based on the third index; acquiring a fourth chroma value among the chroma components, based on the fourth index; acquiring a minimum chroma average value, based on an average value of the third chroma value and the fourth chroma value; acquiring elements of a function indicating a corresponding relation between luma and chroma, based on the maximum luma average value, the minimum luma average value, the maximum chroma average value, and the minimum chroma average value; and predicting a chroma value of the current block by applying a reconstructed luma value of the current block to the function.

The acquiring the elements of the function indicating the corresponding relation between luma and chroma in the method of processing the video signal according to the present disclosure includes: acquiring a first differential value as a difference between the maximum luma average value and the minimum luma average value; acquiring a second differential value as a difference between the maximum chroma average value and the minimum chroma average value; acquiring a first element ($\alpha$) related to a ratio of the second differential value to the first differential value; and acquiring a second element ($\beta$), based on the first element, the minimum luma average value, and the minimum chroma average value, and the predicting of the chroma value of the current block includes predicting the chroma value of the current block, based on the reconstructed luma value of the current block, the first element ($\alpha$), and the second element ($\beta$).

The method of processing the video signal according to the present disclosure further includes down-sampling a reconstructed luma component of the current block, wherein the predicting of the chroma value of the current block includes predicting the chroma value of the current block, based on an equation of (chroma value of current block)= (((luma value included in down-sampled luma components of current block)*$\alpha$)>>S)+$\beta$, S being a constant.

The method of processing the video signal according to the present disclosure further includes: acquiring first information indicating whether a left block adjacent to the current block is available and second information indicating whether an upper block adjacent to the current block is available; when the first information indicates that the left block is available, acquiring the down-sampled luma components, based on the left block; and when the second information indicates that the upper block is available, acquiring the down-sampled luma components, based on the upper block.

In the method of processing the video signal according to the present disclosure, the down-sampled luma components are acquired based on samples included in at least one of a left block or an upper block adjacent to the current block.

In the method of processing the video signal according to the present disclosure, the down-sampled luma components are acquired based on samples included in at least one of rightmost samples of the left block or lowermost samples of the upper bock.

In the method of processing the video signal according to the present disclosure, the down-sampled luma components are acquired based on samples selected at regular intervals from among the rightmost samples of the left block or the lowermost samples of the upper block.

An apparatus for processing a video signal according to the present disclosure includes a processor; and a memory, wherein the processor is configured to perform, based on instructions stored in the memory, steps of: down-sampling reconstructed luma components of a block adjacent to a current block; acquiring a maximum luma value among the down-sampled luma components, based on a first index; acquiring a next highest luma value among the down-sampled luma components, based on a second index; acquiring a maximum luma average value, based on an average value of the maximum luma value and the next highest luma value; acquiring a next lowest luma value among the down-sampled luma components, based on a third index; acquiring a minimum luma value among the down-sampled luma components, based on a fourth index; acquiring a minimum luma average value, based on the next lowest luma value and the minimum luma value; acquiring a first chroma value among chroma components corresponding to the down-sampled luma components, based on the first index; acquiring a second chroma value among the chroma components, based on the second index; acquiring a maximum chroma average value, based on an average value of the first chroma value and the second chroma value; acquiring a third chroma value among the chroma components, based on the third index; acquiring a fourth chroma value among the chroma components, based on the fourth index; acquiring a minimum chroma average value, based on an average value of the third chroma value and the fourth chroma value; acquiring elements of a function indicating a corresponding relation between luma and chroma, based on the maximum luma average value, the minimum luma average value, the maximum chroma average value, and the minimum chroma average value; and predicting a chroma value of the current block by applying a reconstructed luma value of the current block to the function.

In the apparatus for processing the video signal according to the present disclosure, the processor is configured to perform, based on instructions stored in the memory, steps of: acquiring a first differential value as a difference between the maximum luma average value and the minimum luma average value; acquiring a second differential value as a difference between the maximum chroma average value and the minimum chroma average value; acquiring a first element ($\alpha$) related to a ratio of the second differential value to the first differential value; acquiring a second element ($\beta$), based on the first element, the minimum luma average value, and the minimum chroma average value; and predicting the chroma value of the current block, based on the reconstructed luma value of the current block, the first element ($\alpha$), and the second element ($\beta$).

In the apparatus for processing the video signal according to the present disclosure, the processor is configured to perform, based on instructions stored in the memory, steps of: down-sampling a reconstructed luma component of the current block; and predicting the chroma value of the current block, based on an equation of (chroma value of current block)=(((luma value included in down-sampled luma components of current block)*$\alpha$)>>S)+$\beta$, S being a constant.

In the apparatus for processing the video signal according to the present disclosure, the processor is configured to perform, based on instructions stored in the memory, steps of: acquiring first information indicating whether a left block adjacent to the current block is available and second information indicating whether an upper block adjacent to the current block is available; when the first information indicates that the left block is available, acquiring the down-sampled luma components, based on the left block; and when the second information indicates that the upper block is available, acquiring the down-sampled luma components, based on the upper block.

In the apparatus for processing the video signal according to the present disclosure, the down-sampled luma components are acquired based on samples included in at least one a left block or an upper block adjacent to the current block.

In the apparatus for processing the video signal according to the present disclosure, the down-sampled luma components are acquired based on samples included in at least one of rightmost samples of the left block or lowermost samples of the upper bock.

In the apparatus for processing the video signal according to the present disclosure, the down-sampled luma components are acquired based on samples selected at regular intervals from among the rightmost samples of the left block or the lowermost samples of the upper block.

A method of encoding a video signal according to the present disclosure includes: down-sampling reconstructed luma components of a block adjacent to a current block; acquiring a maximum luma value among the down-sampled luma components, based on a first index; acquiring a next highest luma value among the down-sampled luma components, based on a second index; acquiring a maximum luma average value, based on an average value of the maximum luma value and the next highest luma value; acquiring a next lowest luma value among the down-sampled luma components, based on a third index; acquiring a minimum luma value among the down-sampled luma components, based on a fourth index; acquiring a minimum luma average value, based on the next lowest luma value and the minimum luma value; acquiring a first chroma value among chroma components corresponding to the down-sampled luma components, based on the first index; acquiring a second chroma value among the chroma components, based on the second index; acquiring a maximum chroma average value, based on an average value of the first chroma value and the second chroma value; acquiring a third chroma value among the chroma components, based on the third index; acquiring a fourth chroma value among the chroma components, based on the fourth index; acquiring a minimum chroma average value, based on an average value of the third chroma value and the fourth chroma value; acquiring elements of a function indicating a corresponding relation between luma and chroma, based on the maximum luma average value, the minimum luma average value, the maximum chroma average value, and the minimum chroma average value; and predicting a chroma value of the current block by applying a reconstructed luma value of the current block to the function.

An apparatus for encoding a video signal according to the present disclosure includes a processor; and a memory, wherein the processor is configured to perform, based on instructions stored in the memory, steps of: down-sampling reconstructed luma components of a block adjacent to a current block; acquiring a maximum luma value among the down-sampled luma components, based on a first index; acquiring a next highest luma value among the downsampled luma components, based on a second index; acquiring a maximum luma average value, based on an average value of the maximum luma value and the next highest luma value; acquiring a next lowest luma value among the down-sampled luma components, based on a third index; acquiring a minimum luma value among the down-sampled luma components, based on a fourth index; acquiring a minimum luma average value, based on the next lowest luma value and the minimum luma value; acquiring a first chroma value among chroma components corresponding to the down-sampled luma components, based on the first index; acquiring a second chroma value among the chroma components, based on the second index; acquiring a maximum chroma average value, based on an average value of the first chroma value and the second chroma value; acquiring a third chroma value among the chroma components, based on the third index; acquiring a fourth chroma value among the chroma components, based on the fourth index; acquiring a minimum chroma average value, based on an average value of the third chroma value and the fourth chroma value; acquiring elements of a function indicating a corresponding relation between luma and chroma, based on the maximum luma average value, the minimum luma average value, the maximum chroma average value, and the minimum chroma average value; and predicting a chroma value of the current block by applying a reconstructed luma value of the current block to the function.

Advantageous Effects

According to an embodiment of the present disclosure, coding efficiency of a video signal can be improved. According to an embodiment of the present disclosure, a current block can be more accurately predicted based on an intra prediction mode.

DESCRIPTION OF DRAWINGS

FIG. 18 illustrates prediction mode signaling for chroma intra prediction according to an embodiment of the present disclosure.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
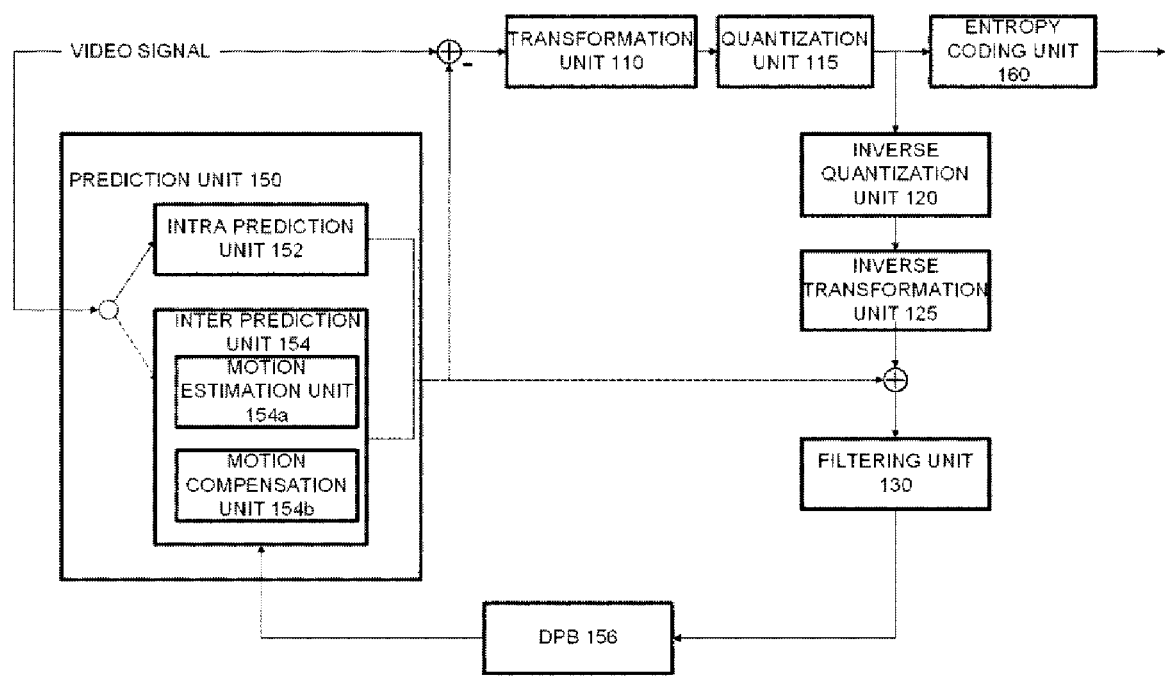
FIG. 1 is a block diagram schematically illustrating a video signal encoding apparatus 100 according to an embodiment of the present disclosure.

FIG. 1 is a schematic block diagram of a video signal encoding apparatus according to an embodiment of the present disclosure. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform may be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that may be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154a and a motion compensation unit 154b. The motion estimation unit 154a obtains a motion vector value of the current region by referring to a specific reconstructed region. The motion estimation unit 154a transfers location information (reference frame, motion vector, etc.) of the reference region to the entropy coding unit 160 so as to enable the location information to be included in a bitstream. The motion compensation unit 154b performs inter motion compensation by using the motion vector value transferred from the motion estimation unit 154a.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154a and the motion compensation unit 154b. The motion estimation unit 154a obtains a motion vector value of the current region by referring to a specific region of the reconstructed reference picture. The motion estimation unit 154a transfers a motion information set (reference picture index, motion vector information, etc.) for the reference region to the entropy coding unit 160. The motion compensation unit 154b performs motion compensation by using the motion vector value transferred from the motion estimation unit 154a. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
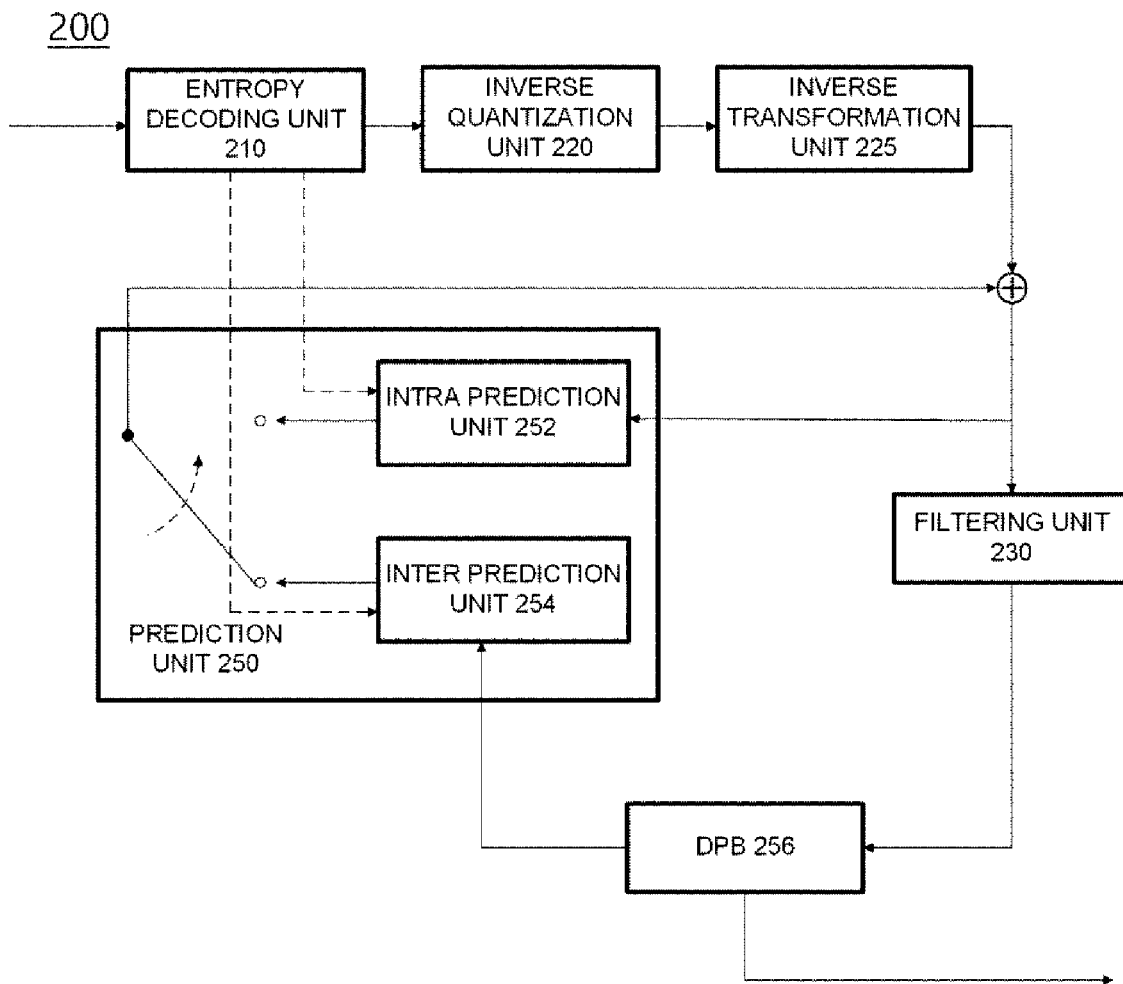
FIG. 2 is a block diagram schematically illustrating a video signal decoding apparatus according to an embodiment of the present disclosure.

FIG. 2 is a schematic block diagram of a video signal decoding apparatus 200 according to an embodiment of the present disclosure. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 reconstructs a residual value by using the inverse-quantized transform coefficient. The video signal processing device 200 reconstructs an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that may perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof may be used as a predictor of the current block. For motion prediction with sub-pel unit pixel accuracy, for example, an 8-tap interpolation filter for a luma signal and a 4-tap interpolation filter for a chroma signal may be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
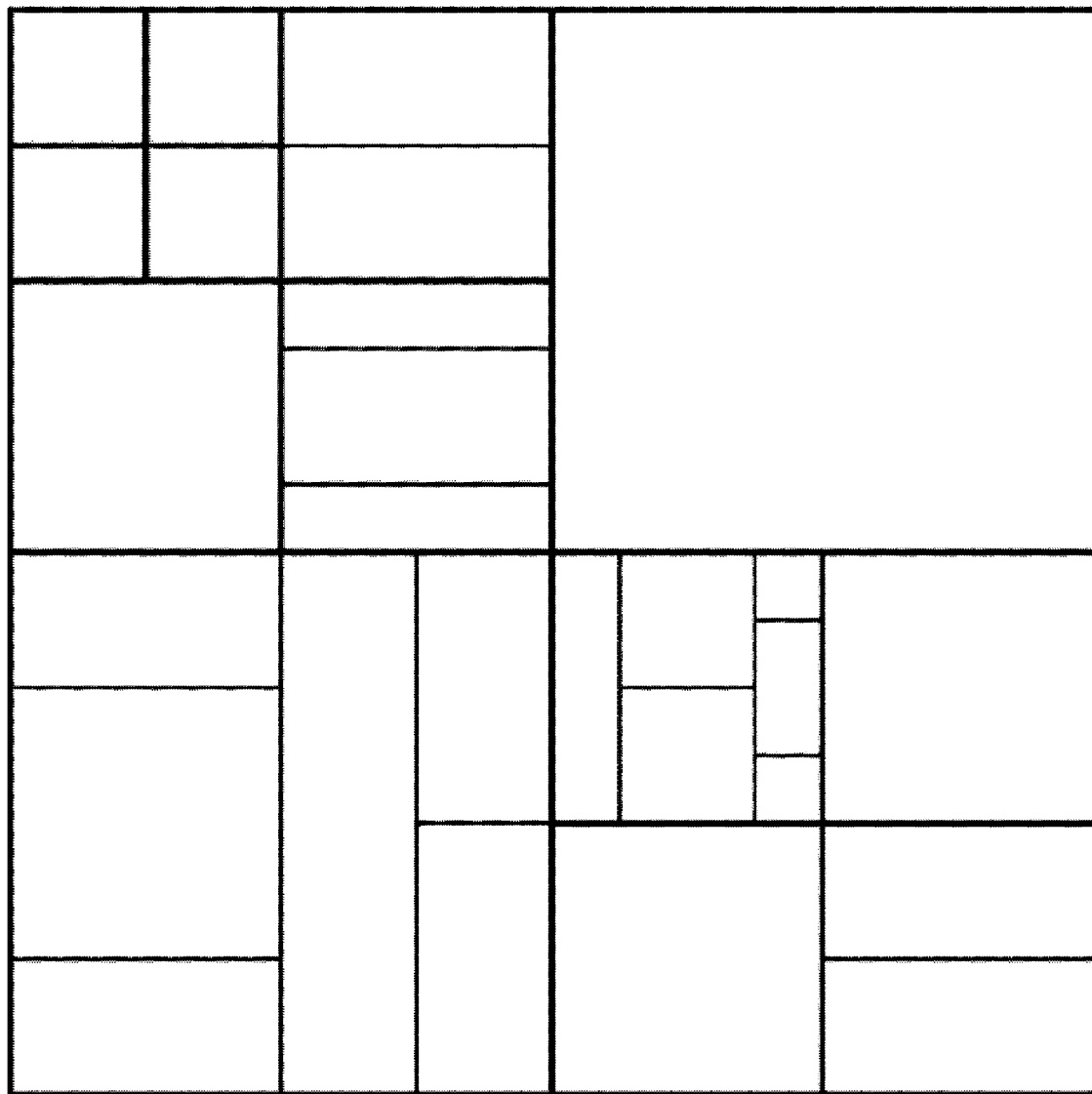
FIG. 3 illustrates an embodiment in which a Coding Tree Unit (CTU) is divided into Coding Units (CUs) within a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit may be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split may be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split may be performed recursively.

The leaf node of the multi-type tree may be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a high level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
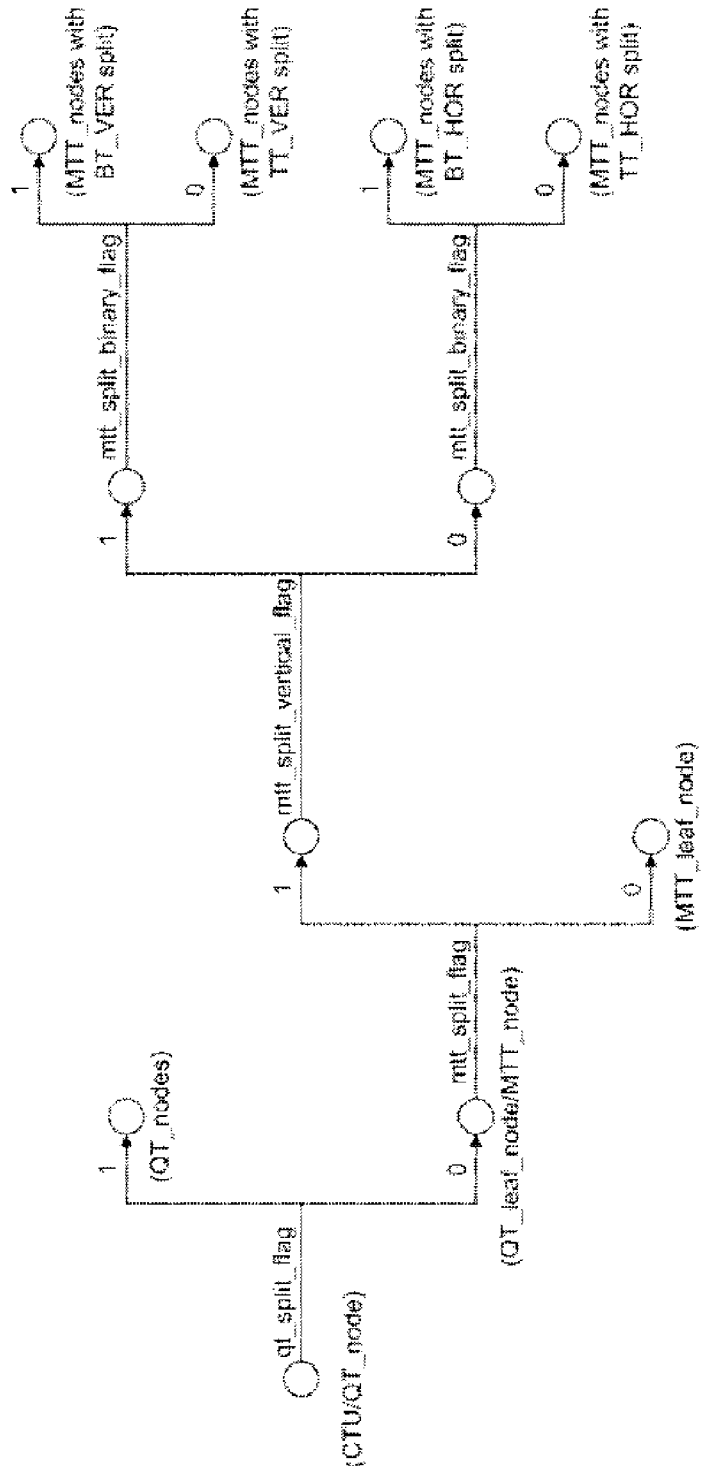
FIG. 4 illustrates an embodiment of a method of signaling division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and may be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT leaf node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
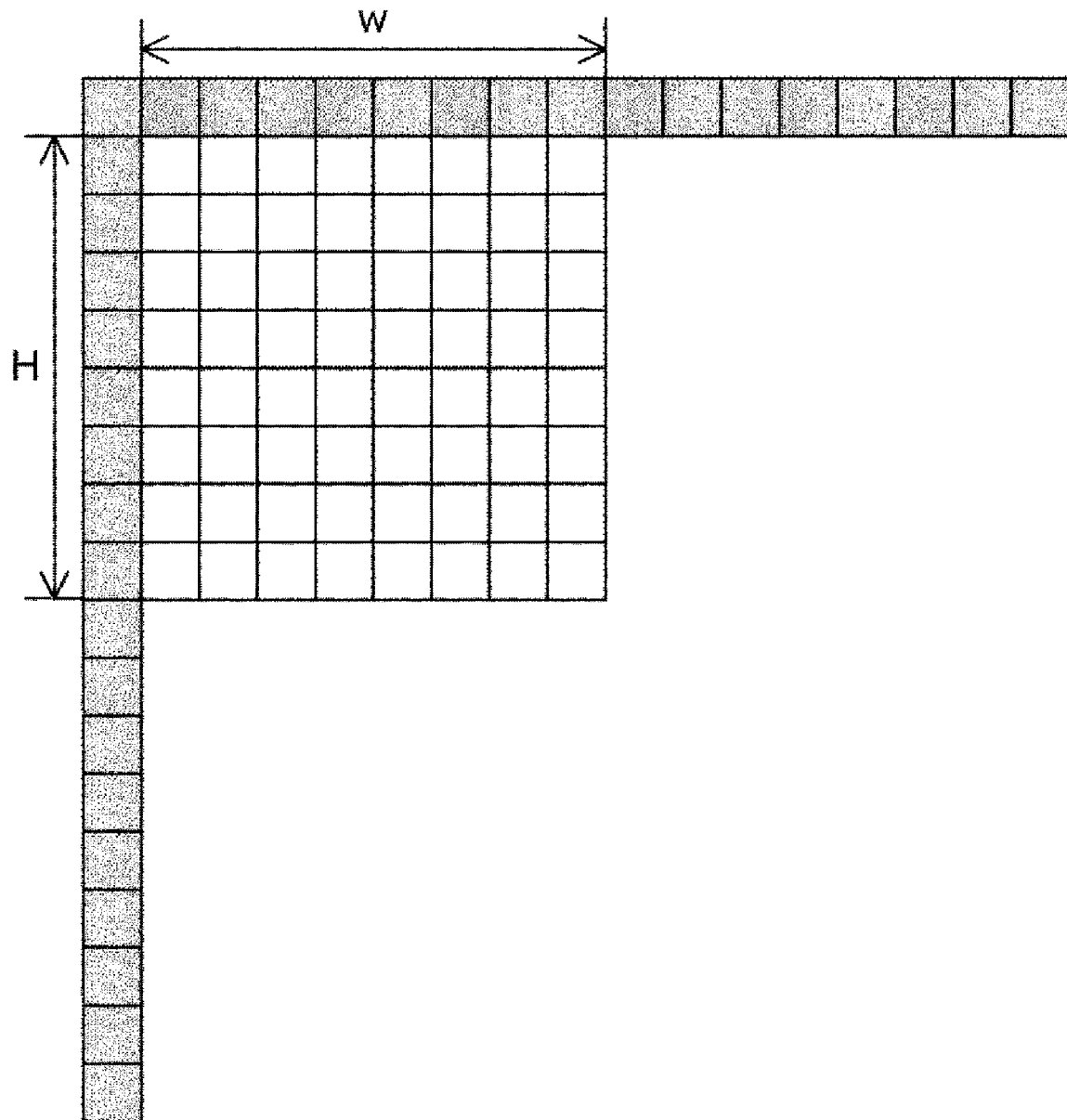
FIG. 5 illustrates an intra prediction method according to an embodiment of the present disclosure in more detail.

FIG. 5 more specifically illustrate an intra prediction method according to an embodiment of the present disclosure. In addition, FIG. 6 more specifically illustrate an intra prediction method according to an embodiment of the present disclosure. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

When at least some samples to be used as reference samples have not yet been reconstructed, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Figure 6:
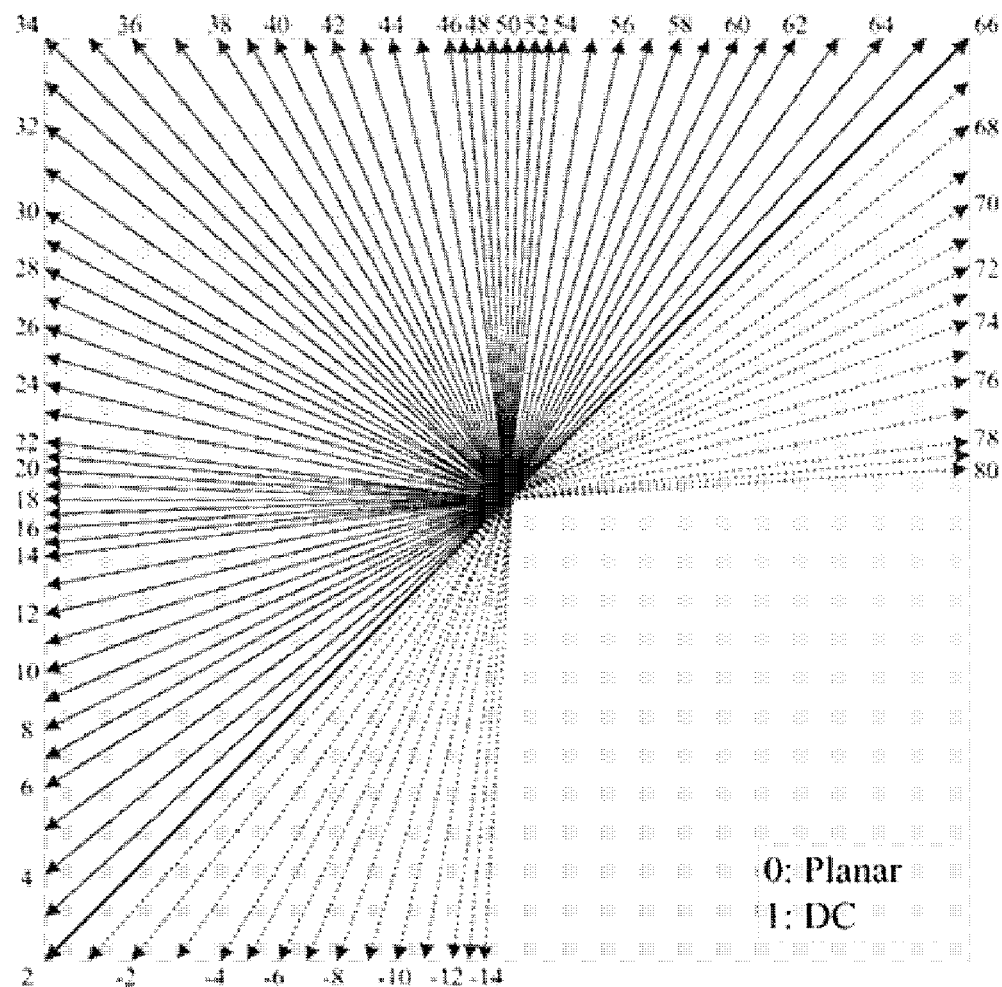
FIG. 6 illustrates the intra prediction method according to an embodiment of the present disclosure in more detail.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Hereinafter, an inter prediction method according to an embodiment of the present disclosure will be described with reference to FIG. 7. In the present disclosure, the inter prediction method may include a general inter prediction method optimized for translation motion, and an inter prediction method based on an affine model. A motion vector may include at least one of a general motion vector for motion compensation according to the general inter prediction method and a control point motion vector for affine motion compensation.

Figure 7:
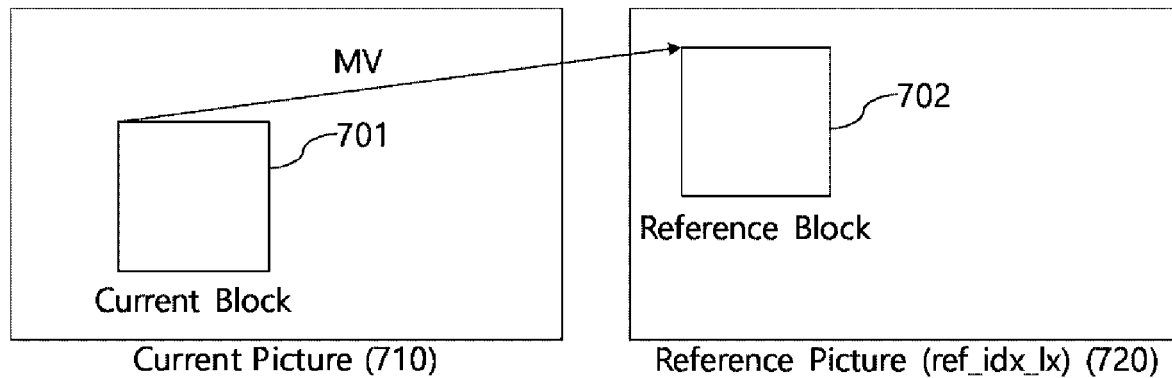
FIG. 7 illustrates an inter prediction method according to an embodiment of the present disclosure.

FIG. 7 illustrates an inter prediction method according to an embodiment of the present disclosure. As described above, a decoder may predict a current block by referring to reconstructed samples of another decoded picture. Referring to FIG. 7, a decoder obtains a reference block 702 in a reference picture 720, based on a motion information set of a current block 701. The motion information set may include a reference picture index and a motion vector 703. The reference picture index indicates the reference picture 720 including the reference block for inter prediction of the current block in a reference picture list. According to an embodiment, the reference picture list may include at least one of the aforementioned L0 picture list and L1 picture list. The motion vector 703 represents an offset between a coordinate value of the current block 701 in the current picture 710 and a coordinate value of the reference block 702 in the reference picture 720. The decoder obtains a predictor of the current block 701 based on sample values of the reference block 702, and reconstructs the current block 701 by using the predictor.

Specifically, an encoder may obtain the aforementioned reference block by searching for a block similar to the current block from pictures having an earlier reconstruction order. For example, the encoder may search for a reference block in which the sum of differences between the current block and the sample values is minimum within a preconfigured search area. In order to measure a similarity between the samples of the current block and the reference block, at least one of a sum of absolute difference (SAD) or a sum of Hadamard transformed difference (SATD) may be used. The SAD may be a value obtained by summing all absolute values of respective differences between the sample values included in the two blocks. The SATD may be a value obtained by adding all absolute values of Hadamard transform coefficients obtained by performing Hadamard transform of the difference between the sample values included in two blocks.

The current block may be predicted using one or more reference areas. As described above, the current block may be inter predicted via a bi-prediction scheme using two or more reference areas. According to an embodiment, the decoder may obtain two reference blocks, based on two motion information sets of the current block. The decoder may obtain a first predictor and a second predictor of the current block, based on sample values of the respective two obtained reference blocks. The decoder may reconstruct the current block by using the first predictor and the second predictor. For example, the decoder may reconstruct the current block, based on an average per sample for the first predictor and the second predictor.

As described above, for motion compensation of the current block, one or more motion information sets may be signaled. Similarity between the motion information sets for motion compensation of each of multiple blocks may be used. For example, the motion information set used for prediction of the current block may be derived from the motion information set used for prediction of one of previously reconstructed other samples. Accordingly, the encoder and decoder may reduce signaling overhead.

For example, there may be a plurality of candidate blocks that may have been predicted based on the same or similar motion information set as the motion information set of the current block. The decoder may generate a merge candidate list based on the plurality of candidate blocks. The merge candidate list may include a candidate corresponding to a sample that may have been predicted based on a motion information set related to the motion information set of the current block, from among samples reconstructed before the current block. The encoder and the decoder may configure a merge candidate list of the current block according to a predefined rule. The merge candidate lists configured by each of the encoder and the decoder may be identical to each other. For example, the encoder and the decoder may configure a merge candidate list of the current block, based on the position of the current block within the current picture. A method of configuring the merge candidate list of the current block by the encoder and the decoder will be described later with reference to FIG. 9. In the present disclosure, a position of a specific block indicates a relative position of a top-left sample of the specific block within a picture including the specific block.

Meanwhile, in order to improve coding efficiency, a method of quantizing a transform coefficient value obtained by transforming a residual signal and the quantized transform coefficient may be used instead of coding the above-described residual as it is. As described above, the transform unit may obtain a transform coefficient value by transforming a residual signal. In this case, the residual signal of a specific block may be distributed over an entire area of the current block. Accordingly, it is possible to improve coding efficiency by concentrating energy in the low frequency region through frequency domain conversion of a residual signal. Hereinafter, a method of transforming or inversely transforming a residual signal will be described in detail.

Figure 8:
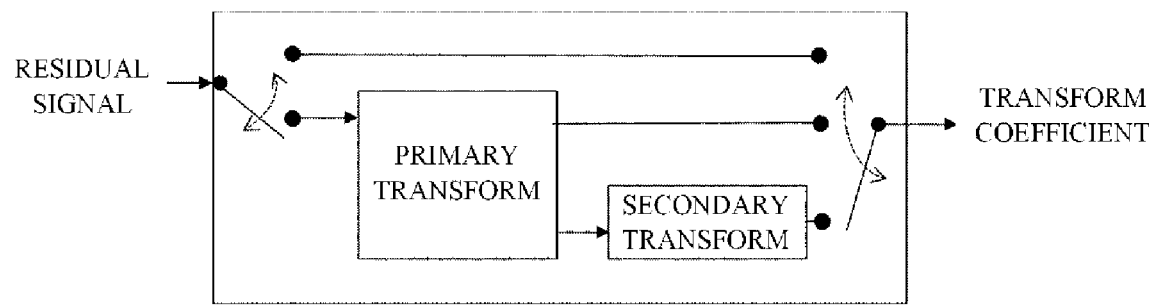
FIG. 8 illustrates a method by which an encoder converts a residual signal in detail.

FIG. 8 is a diagram specifically illustrating a method for transforming a residual signal by an encoder. As described above, a residual signal in a spatial domain may be transformed to a frequency domain. An encoder may obtain a transform coefficient by transforming the obtained residual signal. First, the encoder may obtain at least one residual block including a residual signal for a current block. The residual block may be either the current block or one of blocks divided from the current block. In the present disclosure, the residual block may be referred to as a residual array or a residual matrix which include residual samples of the current block. In the present disclosure, the residual block may represent a transform unit or a block having the same size as that of the transform block.

Next, the encoder may transform the residual block by using a transform kernel. The transform kernel used for transformation of the residual block may be a transform kernel having separable characteristics of vertical transform and horizontal transform. In this case, the transform for the residual block may be performed separately into vertical transform and horizontal transform. For example, the encoder may perform vertical transformation by applying a transform kernel in the vertical direction of the residual block. The encoder may perform horizontal transform by applying the transform kernel in the horizontal direction of the residual block. In the present disclosure, the transform kernel may be used as a term to refer to a parameter set used for transform of the residual signal, such as transform matrix, transform array, transform function, and transform. According to an embodiment, the transform kernel may be any one of a plurality of available kernels. A transform kernel based on different transform types may be used for each of the vertical transform and the horizontal transform.

The encoder may transfer the transform block transformed from the residual block to a quantization unit and quantize the transform block. The transform block may include a plurality of transform coefficients. Specifically, the transform block may include the plurality of transform coefficients arranged in two dimensions. As in the case of the residual block, the size of the transform block may be the same as the size of either the current block or the block divided from the current block. The transform coefficients transferred to the quantization unit may be expressed as quantized values.

The encoder may perform additional transform before the transform coefficients are quantized. As illustrated in FIG. 8, the above-described transform method may be referred to as a primary transform, and an additional transform may be referred to as a secondary transform. The secondary transform may be selective for each residual block. According to an embodiment, the encoder may improve coding efficiency by performing secondary transform for a region where it is difficult to concentrate energy in a low-frequency region only by primary transform. For example, secondary transform may be added to a block in which residual values appear larger in a direction other than the horizontal or vertical direction of the residual block. The residual values of an intra-predicted block may have a higher probability of transformation in a direction other than the horizontal or vertical direction compared to the residual values of an inter-predicted block. Accordingly, the encoder may additionally perform secondary transform on the residual signal of the intra-predicted block. The encoder may omit secondary transform for the residual signal of the inter-predicted block.

As another example, whether to perform secondary transform may be determined depending on the size of the current block or the size of the residual block. Transform kernels having different sizes may be used depending on the size of the current block or the size of the residual block. For example, 8×8 secondary transform may be applied to a block in which a length of a shorter side between a width or a height is shorter than a first preconfigured length. Further, 4×4 secondary transform may be applied to a block in which the length of the shorter side between the width or the height is longer than a second preconfigured length. Here, the first preconfigured length may be a value larger than the second preconfigured length, but the present disclosure is not limited thereto. Unlike primary transform, secondary transform may not be performed separately into vertical transform and horizontal transform. This secondary transform may be referred to as a low frequency band non-separable transform (low frequency non-separable transform, LFNST).

In the case of a video signal in a specific region, energy in a high frequency band may not be reduced even if frequency transformation is performed due to a sudden change in brightness. Accordingly, compression performance due to quantization may be deteriorated. When transform is performed on a region in which a residual value rarely exists, an encoding time and a decoding time may be unnecessarily increased. Accordingly, transform on the residual signal of the specific region may be omitted. Whether to perform transform on the residual signal of the specific region may be determined by a syntax element related to transform of the specific region. For example, the syntax element may include transform skip information. The transform skip information may be a transform skip flag. If the transform skip information on the residual block indicates a transform skip, transform on the residual block is not performed. In this case, the encoder may immediately quantize the residual signal on which transform of a corresponding region has not been performed. The operations of the encoder described with reference to FIG. 8 may be performed via the transform unit of FIG. 1.

The above-described transform-related syntax elements may be information parsed from a video signal bitstream. The decoder may entropy-decode the video signal bitstream so as to obtain transform-related syntax elements. The encoder may entropy-code the transform-related syntax elements so as to generate a video signal bitstream.

Figure 9:
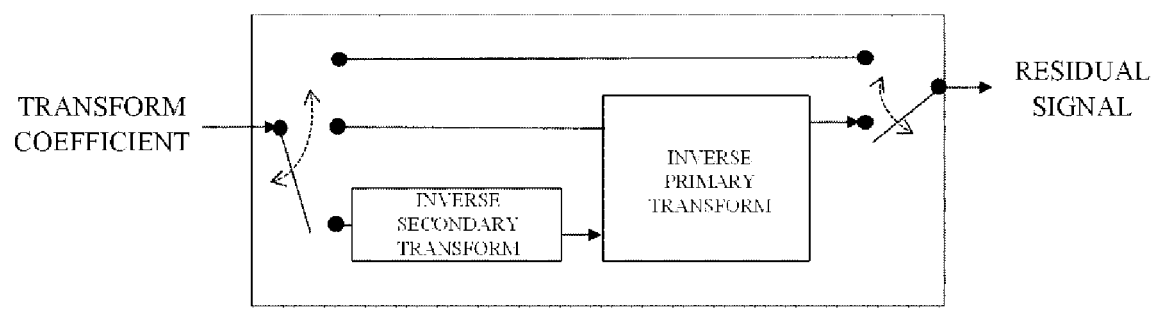
FIG. 9 illustrates a method by which an encoder and a decoder acquire a residual signal by inversely converting a conversion factor in detail.

FIG. 9 is a diagram specifically illustrating a method for obtaining a residual signal by inverse transforming a transformation coefficient by an encoder and a decoder. For the convenience of description, it will be described that an inverse transform operation is performed via an inverse transform unit of each of an encoder and a decoder. The inverse transform unit may obtain a residual signal by inverse transforming an inverse quantized transform coefficient. First, the inverse transform unit may detect whether inverse transform for a specific region is performed, from a transform-related syntax element of the region. According to an embodiment, when a transform-related syntax element for a specific transform block indicates a transform skip, transform on the transform block may be omitted. In this case, both the primary inverse transform and the secondary inverse transform described above regarding the transform block may be omitted. The inverse quantized transform coefficient may be used as a residual signal. For example, the decoder may reconstruct a current block by using the inverse quantized transform coefficient as a residual signal.

According to another embodiment, the transform-related syntax element for the specific transform block may not indicate a transform skip. In this case, the inverse transform unit may determine whether to perform secondary inverse transform for secondary transform. For example, when the transform block is a transform block of an intra-predicted block, secondary inverse transform may be performed on the transform block. A secondary transform kernel used for the transform block may be determined based on an intra prediction mode corresponding to the transform block. As another example, whether to perform secondary inverse transform may be determined based on the size of the transform block. Secondary inverse transform may be performed after inverse quantization and before primary inverse transform.

The inverse transform unit may perform primary inverse transform on the inverse quantized transform coefficient or a secondary inverse transformed transform coefficient. In the case of primary inverse transform, vertical transform and horizontal transform may be performed separately as in the case of primary transform. For example, the inverse transform unit may obtain a residual block by performing vertical inverse transform and horizontal inverse transform on the transform block. The inverse transform unit may inverse transform the transform block based on the transform kernel used for transforming the transform block. For example, the encoder may explicitly or implicitly signal information indicating the transform kernel applied to the current transform block from among a plurality of available transform kernels. The decoder may select a transform kernel to be used for inverse transform of the transform block from among the plurality of available transform kernels by using information indicating the signaled transform kernel. The inverse transform unit may reconstruct the current block by using the residual signal obtained via inverse transform on the transform coefficient.

Figure 10:
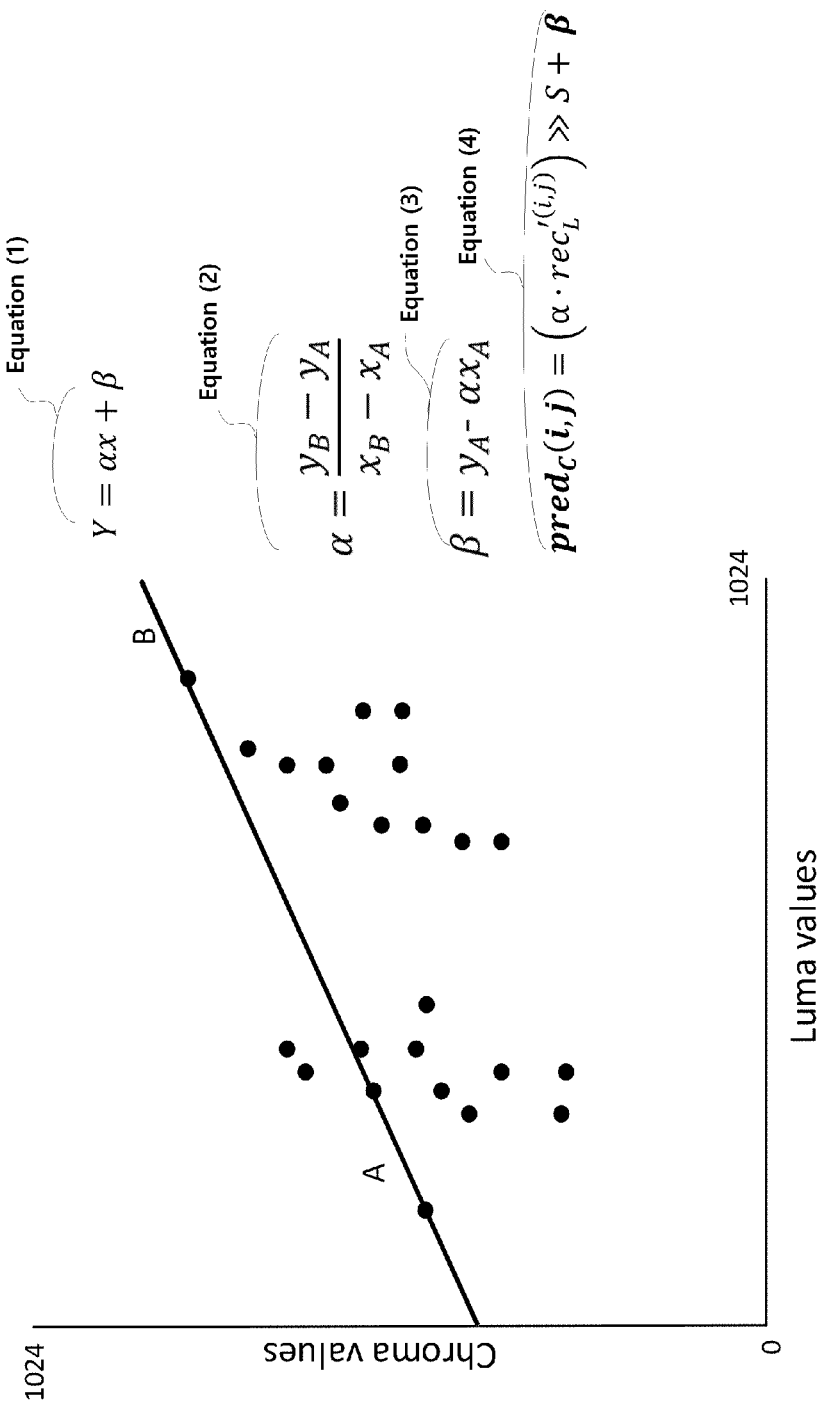
FIG. 10 illustrates a Cross Component Linear Model (CCLM) method according to an embodiment of the present disclosure.

FIG. 10 illustrates a Cross Component Linear Model (CCLM) method according to an embodiment of the present disclosure.

A minimum value and a maximum value of luma are obtained using reconstructed luma and chroma adjacent to a current block, and Equation (1) is induced from Equation (2) and Equation (3) using the two values. Finally, chroma is predicted using a reconstructed luma value of the current block through Equation (4). When an image format is 4:2:0, luma samples are adjusted to the number of chroma samples by applying a down-sampling filter.

More specifically, an encoder or a decoder may perform a step of down-sampling a luma component of a reconstructed block adjacent to the current block. The reconstructed block adjacent to the current block may be at least one of an upper block or a left block of the current block.

In a YCbCr image system, types of sub-sampling may include 8:4:4, 4:4:4, 4:2:2, 4:1:1, 4:2:0. In the case of 4:4:4, a luma component and two chroma components may have the same number of samples. However, in the case of 4:2:2 or 4:2:0, the number of samples of the luma component may be larger than the number of samples of the chroma component. Accordingly, the encoder or the decoder may down-sample the luma component so as to fit the number of samples of the luma component to the number of samples of the chroma component. That is, the encoder or the decoder may put the luma components and the chroma components in one-to-one correspondence and derive a linear equation of the luma component and the chroma component. For example, the linear equation may be Equation (1) of FIG. 10.

The encoder or the decoder may reconstruct at least one of the upper block of the current block or the left block of the current block earlier than the current block. The encoder or the decoder may predict values of the chroma samples of the current block based on sample values of the reconstructed upper block or left block.

The vertical axis of FIG. 10 indicates chroma values of pixels included in the upper block of the current block or the left block of the current block. Further, the horizontal axis indicates luma values of pixels included in the upper block of the current block or the left block of the current block.

The chroma value in the present disclosure may indicate a sample value of the chroma component of the pixel included in the block. In the present disclosure, the luma value may indicate a sample value of the luma component of the pixel included in the block.

The encoder or the decoder may acquire two pixels from at least one of the upper block or the left block in order to obtain Equation (2) or Equation (2). For example, the encoder or the decoder may acquire pixel A and pixel B. The encoder or the decoder may acquire xA as the luma component of point pixel A and acquire yA as the chroma component of pixel A. The encoder or the decoder may acquire xB as the luma component of point pixel B and acquire yB as the chroma component of pixel B.

The encoder or the decoder may derive Equations (1) to (4) using the luma components and the chroma components of pixel A and pixel B. Further, the encoder or the decoder may predict chroma components of the current block by applying Equation (4) to the reconstructed luma components of the current block.

Figure 11:
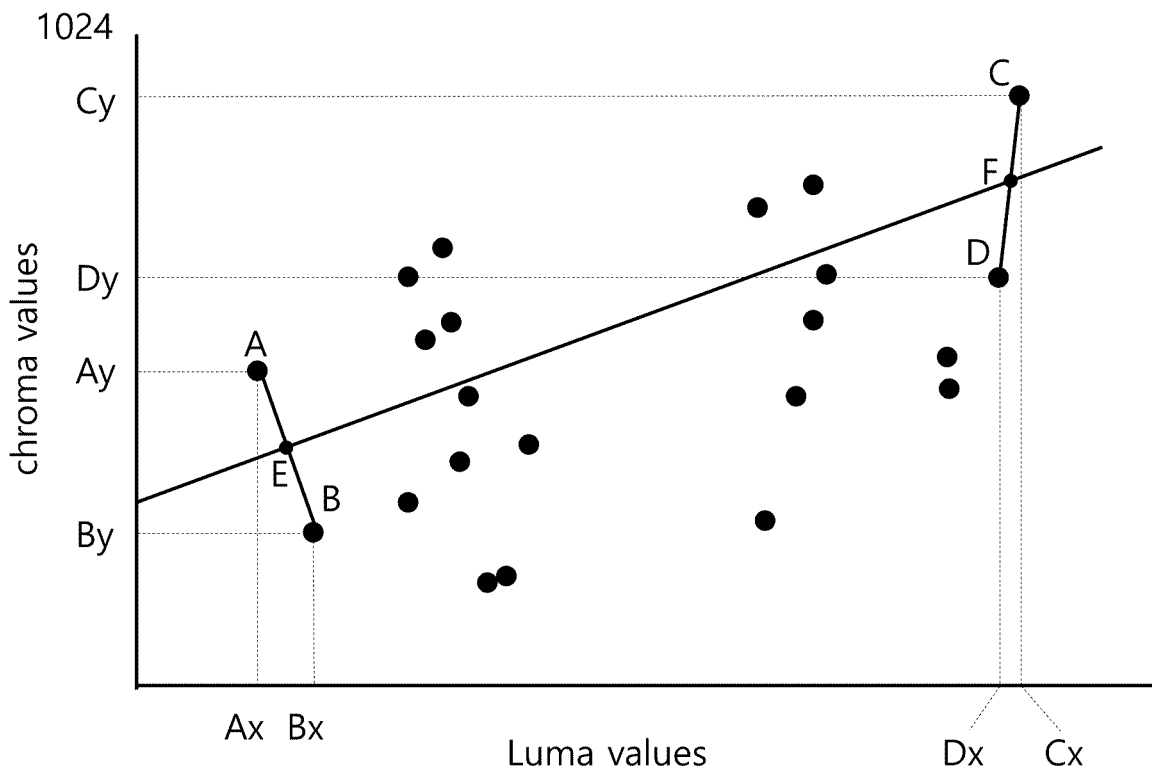
FIG. 11 illustrates a method of determining a linear model of the CCLM according to an embodiment of the present disclosure.

FIG. 11 illustrates a method of determining a linear model of the CCLM according to an embodiment of the present disclosure.

Unlike the method of FIG. 10, in FIG. 11, Equation (1) is induced using Equations (2) and (3) used in FIG. 10 based on F of FIG. 11 that is an average of a maximum value (C of FIG. 11) and a next highest value (D of FIG. 11) of luma and E of FIG. 11 that is an average of a minimum value (A of FIG. 11) and a next lowest minimum value (B of FIG. 11) of luma. This may mitigate distortion that the maximum/minimum value may have. Although FIG. 11 has described the example of averaging two sample values of the maximum/minimum value and the next highest/lowest value, an average value within a predetermined number of maximum value groups and minimum value groups may be used, and values within a range of a specific value may be averaged.

More specifically, the encoder or the decoder may perform a step of down-sampling luma components of a reconstructed block adjacent to the current block. The adjacent reconstructed block may be an upper block or a left block of the current block. The encoder or the decoder may down-sample luma components of the adjacent block so as to fit the number of samples of the luma components to the number of samples of the chroma components. That is, the encoder or the decoder may put the luma components and the chroma components in one-to-one correspondence and derive a linear equation of the luma component and the chroma component.

The encoder or the decoder may perform a step of acquiring a maximum luma value among down-sampled luma components based on a first index. For example, the maximum luma value is acquired as shown in the following equation.

Maximum luma value=Down-sampled luma component [First index]

In the present disclosure, the luma value may indicate a sample value of the luma component of the pixel included in the block. The first index may correspond to C of FIG. 11. The encoder or the decoder may acquire the first index based on a predetermined procedure. The first index may be an index indicating a maximum luma value among down-sampled luma components. For example, referring to FIG. 11, the encoder or the decoder may acquire Cx based on the first index among the down-sampled luma components.

The encoder or the decoder may acquire down-sampled luma components from the reconstructed upper block or left block. The encoder or the decoder may use only some of the down-sampled luma components. For example, the down-sampled luma components may be acquired based on samples included in at least one of the rightmost samples of the left block or the lowermost samples of the upper block.

Further, the down-sampled luma components may be acquired based on samples selected at regular intervals from among the rightmost samples of the left block or the lowermost samples of the upper block.

The encoder or the decoder may perform a step of acquiring a next highest luma value among the down-sampled luma components based on a second index. For example, the next highest luma value is acquired as shown in the following equation.

Next highest luma value=Down-sampled luma component [Second index]

The second index may correspond to D of FIG. 11. The encoder or the decoder may acquire the second index based on a predetermined procedure. The second index may be an index indicating a next highest luma value among down-sampled luma components. For example, referring to FIG. 11, the encoder or the decoder may acquire, based on the second index, Dx among the down-sampled luma components.

The encoder or the decoder may perform a step of acquiring a maximum luma average value based on the average value of the maximum luma value and the next highest luma value. The maximum luma average value may correspond to a luma value of F in FIG. 11.

The encoder or the decoder may acquire the maximum luma average value based on an equation of "(maximum luma value+next highest luma value)>>1" or "(maximum luma value+next highest luma value+1)>>1". The average value may be an integer. The encoder or the decoder may acquire an average value obtained by not rounding off below the decimal point based on "(maximum luma value+next highest luma value)>>1". Further, the encoder or the decoder may acquire an average value obtained by rounding off below the decimal point based on "(maximum luma value+next highest luma value+1)>>1".

The encoder or the decoder may perform a step of acquiring a next lowest luma value among the down-sampled luma components based on a third index. For example, the next lowest luma value is acquired as shown in the following equation.

Next lowest luma value=Down-sampled luma component [Third index]

The third index may correspond to B of FIG. 11. The encoder or the decoder may acquire the third index based on a predetermined procedure. The third index may be an index indicating a next lowest luma value among the down-sampled luma components. For example, referring to FIG. 11, the encoder or the decoder may acquire Bx based on the third index among the down-sampled luma components.

The encoder or the decoder may perform a step of acquiring a minimum luma value among the down-sampled luma components based on a fourth index. For example, the minimum luma value is acquired as shown in the following equation.

Maximum luma value=Down-sampled luma component [Fourth index]

The fourth index may correspond to A of FIG. 11. The encoder or the decoder may acquire the fourth index based on a predetermined procedure. The fourth index may be an index indicating a minimum luma value among the down-sampled luma components. For example, referring to FIG. 11, the encoder or the decoder may acquire Ax based on the fourth index among the down-sampled luma components.

The encoder or the decoder may perform a step of acquiring a minimum luma average value based on a next lowest luma value and the minimum luma value. The encoder or the decoder may perform a step of acquiring the minimum luma average value based on the next lowest luma value and the minimum luma value. The minimum luma average value may correspond to a luma value of E in FIG. 11. The encoder or the decoder may acquire the minimum luma average value based on an equation of "(next lowest luma value+minimum luma value)>>1" or "(next lowest luma value+minimum luma value+1)>>1". Since the method of acquiring the average value has been already described, the description thereof will be omitted.

Hereinafter, a method of acquiring the first index to the fourth index is described. The encoder or the decoder may configure the first index to the fourth index as initial values in order to acquire the first index to the fourth index. The third index to the fourth index may have different values. The encoder or the decoder may acquire a third value among the down-sampled luma components based on the third index and acquire a fourth value among the down-sampled luma components based on the fourth index. When the fourth value is larger than the third value, the encoder or the decoder may swap values of the third index and the fourth index. That is, the encoder or the decoder may determine that the value of the third index after swapping is the value of the fourth index before swapping and that the value of the fourth index after swapping is the value of the third index before swapping.

Further, after the above process, the encoder or the decoder may acquire the first value among the down-sampled luma components based on the first index and acquire the second value among the down-sampled luma components based on the second index. When the second value is larger than the first value, the encoder or the decoder may swap values of the first index and the second index. That is, the encoder or the decoder may determine that the value of the first index after swapping is the value of the second index before swapping and that the value of the second index after swapping is the value of the first index before swapping.

Further, after the above process, the encoder or the decoder may acquire the first value among the down-sampled luma components based on the first index and acquire the fourth value among the down-sampled luma components based on the fourth index. When the fourth value is larger than the first value, the encoder or the decoder may swap values of the first index and the third index and swap values of the second index and the fourth index. That is, the encoder or the decoder may determine that the value of the first index after swapping is the value of the third index before swapping, that the value of the third index after swapping is the value of the first index before swapping, that the value of the second index after swapping is the value of the fourth index before swapping, and that the value of the fourth index after swapping is the value of the second index before swapping.

Further, after the above process, the encoder or the decoder may acquire the second value among the down-sampled luma components based on the second index and acquire the third value among the down-sampled luma components based on the third index. When the third value is larger than the second value, the encoder or the decoder may swap values of the second index and the third index. That is, the encoder or the decoder may determine that the value of the second index after swapping is the value of the third index before swapping and that the value of the third index after swapping is the value of the second index before swapping.

The procedure of determining the first index to the fourth index has been described above. However, a procedure performed by the encoder or the decoder is not limited to the above procedure. The encoder or the decoder may use various methods of arranging the indexes and the luma values such that the first index to the fourth index sequentially indicate the maximum luma value, the next highest luma value, the next lowest luma value, and the minimum luma value among the down-sampled luma components.

The encoder or the decoder may perform a step of acquiring a first chroma value among chroma components corresponding to the down-sampled luma components based on the first index. For example, the first chroma value is acquired as shown in the following equation.

First chroma value=Chroma component [First index]

As described above, the chroma value may indicate the sample value of the chroma component of the pixel included in the block in the present disclosure. Further, the first index may correspond to A of FIG. 11. Referring to FIG. 11, the encoder or the decoder may acquire Cy among the chroma components based on the first index.

The first index may be an index indicating the maximum luma value among the down-sampled luma components. However, the first chroma value acquired based on the first index among the chroma components corresponding to the down-sampled luma components may or may not be a maximum value of the chroma components. That is, the first index does not indicate that the first chroma value is the maximum value of the chroma components.

The encoder or the decoder may perform a step of acquiring a second chroma value among the chroma components based on the second index. For example, the second chroma value is acquired as shown in the following equation.

Second chroma value=Chroma component [Second index]

As described above, the second index may correspond to D of FIG. 11. Referring to FIG. 11, the encoder or the decoder may acquire Dy based on the second index among the chroma components.

The second index may be an index indicating the next highest luma value among the down-sampled luma components. However, the second chroma value acquired based on the second index among the chroma components corresponding to the down-sampled luma components may or may not be a next highest value of the chroma components. That is, the second index does not indicate that the second chroma value is the next highest value of the chroma components. For example, the second chroma value may be larger than, equal to, or smaller than the first chroma value.

The encoder or the decoder may perform a step of acquiring a maximum chroma average value based on an average value of the first chroma value and the second chroma value. The encoder or the decoder may perform a step of acquiring a maximum chroma average value based on an average value of the first chroma value and the second chroma value. The minimum chroma average value may correspond to a chroma value of F in FIG. 11.

The encoder or the decoder may acquire a maximum chroma average value based on an equation of "(first chroma value+second chroma value)>>1" or "(first chroma value+second chroma value+1)>>1". Since the method of acquiring the average value has been already described, the description thereof will be omitted.

The encoder or the decoder may perform a step of acquiring a third chroma value among the chroma components based on the third index. For example, the third chroma value is acquired as shown in the following equation.

Third chroma value=Chroma component [Third index]

As described above, the third index may correspond to B of FIG. 11. Referring to FIG. 11, the encoder or the decoder may acquire By among the chroma components based on the third index.

The third index may be an index indicating a next lowest luma value among the down-sampled luma components. However, the third chroma value acquired based on the third index among the chroma components corresponding to the down-sampled luma components may or may not be a next lowest value of the chroma components. That is, the third index does not indicate that the third chroma value is the next lowest value of the chroma components.

The encoder or the decoder may perform a step of acquiring a fourth chroma value among the chroma components based on the fourth index. For example, the fourth chroma value is acquired as shown in the following equation.

Fourth chroma value=Chroma component [Fourth index]

As described above, the fourth index may correspond to A of FIG. 11. Referring to FIG. 11, the encoder or the decoder may acquire Ay among the chroma components based on the fourth index.

The fourth index may be an index indicating a minimum luma value among the down-sampled luma components. However, the fourth chroma value acquired based on the fourth index among the chroma components corresponding to the down-sampled luma components may or may not be a minimum value of the chroma components. That is, the fourth index does not indicate that the fourth chroma value is the minimum value of the chroma components. For example, the fourth chroma value may be larger than, equal to, or smaller than the third chroma value.

The encoder or the decoder may perform a step of acquiring a minimum chroma average value based on an average value of the third chroma value and the fourth chroma value. The encoder or the decoder may perform a step of acquiring a minimum chroma average value based on the third chroma value and an average value of the third chroma value. The minimum chroma average value may correspond to a chroma value of E in FIG. 11.

The encoder or the decoder may acquire the minimum chroma average value based on an equation of "(third chroma value+fourth chroma value)>>1" or "(third chroma value+fourth chroma value+1)>>1". Since the method of acquiring the average value has been already described, the description thereof will be omitted.

The encoder or the decoder may perform a step of acquiring elements of a function indicating a corresponding relation between luma and chroma based on the maximum luma average value, the minimum luma average value, the maximum chroma average value, and the minimum chroma average value. The function indicating the corresponding relation between luma and chroma may be Equation (1) or Equation (4) of FIG. 10.

In Equation (1), x may be acquired based on a reconstructed luma component of the current block. In order to fit the number of samples of the luma component included in the current block to the number of samples of the chroma component included in the current block, the encoder or the decoder may down-sample the reconstructed luma component of the current block. The encoder or the decoder may predict a chroma component (Y) by applying a down-sampled luma component (X) of the current block to Equation (1).

In Equation (4), recL may denote the down-sampled luma component of the current block. S may be a predetermined constant or may be a value acquired based on the maximum luma average value, the minimum luma average value, the maximum chroma average value, and the minimum chroma average value. $pred_C$ may denote a predicted chroma component. In Equation (4), $\alpha$ and $\beta$ may be derived by Equation (2) and Equation (3).

In Equation (2) and Equation (3), $y_B$ may denote the maximum chroma average value. $y_A$ may denote the minimum chroma average value. $x_B$ may denote the maximum luma average value. $x_A$ may denote the minimum luma average value.

In order to acquire elements of the function indicating the corresponding relation between luma and chroma, the encoder or the decoder may perform a step of acquiring a first differential value as a difference between the maximum luma average value and the minimum luma average value. Further, the encoder or the decoder may perform a step of acquiring a second differential value as a difference between the maximum chroma average value and the minimum chroma average value.

The encoder or the decoder may perform a step of acquiring a first element ($\alpha$) related to a ratio of the second differential value to the first different value. For example, the encoder or the decoder may acquire the first element ($\alpha$) based on Equation (2).

The encoder or the decoder may perform a step of acquiring a second element ($\beta$) based on the first element, the minimum luma average value and the minimum chroma average value. For example, the encoder or the decoder may acquire the second element ($\beta$) based on Equation (3).

The encoder or the decoder may perform a step of predicting a chroma value of the current block based on the reconstructed luma value of the current block, the first element ($\alpha$) and the second element ($\beta$). For example, the encoder or the decoder may predict the chroma value of the current block based on Equation (1) or Equation (4). The luma value may be a sample value included in the luma component of the current block, and the chroma value may be a sample value included in the predicted chroma component of the current block.

The encoder or the decoder may perform a step of predicting the chroma value of the current block by applying the reconstructed luma value of the current block to the function. As described above, the encoder or the decoder may reconstruct the luma component of the current block. Further, the encoder or the decoder may fit the number of samples of the luma component included in the current block to the number of samples of the chroma component. That is, the encoder or the decoder may perform a step of down-sampling the reconstructed luma component of the current block. Further, the encoder or the decoder may predict the chroma component by applying the down-sampled luma component to Equation (1) or Equation (4). More specifically, the encoder or the decoder may perform a step of predicting the chroma value of the current block based on the following equation. The following equation describes Equation (4) in detail.

(Chroma value of current block)=(((Luma value included in down-sampled luma component of current block)*$\alpha$)>>S)+$\beta$;

As described above, S may be a predetermined constant. However, it is not limited thereto, and the S may be a value acquired based on the maximum luma average value, the minimum luma average value, the maximum chroma average value, or the minimum chroma average value.

However, it is not limited thereto, and the encoder or the decoder may perform a step of predicting the chroma value based on the following equation obtained by modifying Equation (4).

(Chroma value of current block)=Clip1$C$((((Luma value included in down-sampled luma component of current block)*α)>>$S$)+β)

Clip1C may be given as follows.

Clip1$C(x)$=Clip3(0,(1<<BitDepth$C$)−1,$x$)

Clip3(x,y,z)=
x; when z<x
y; when z>y
z; otherwise

BitDepthC denotes bit depth of the chroma component.

Figure 12:
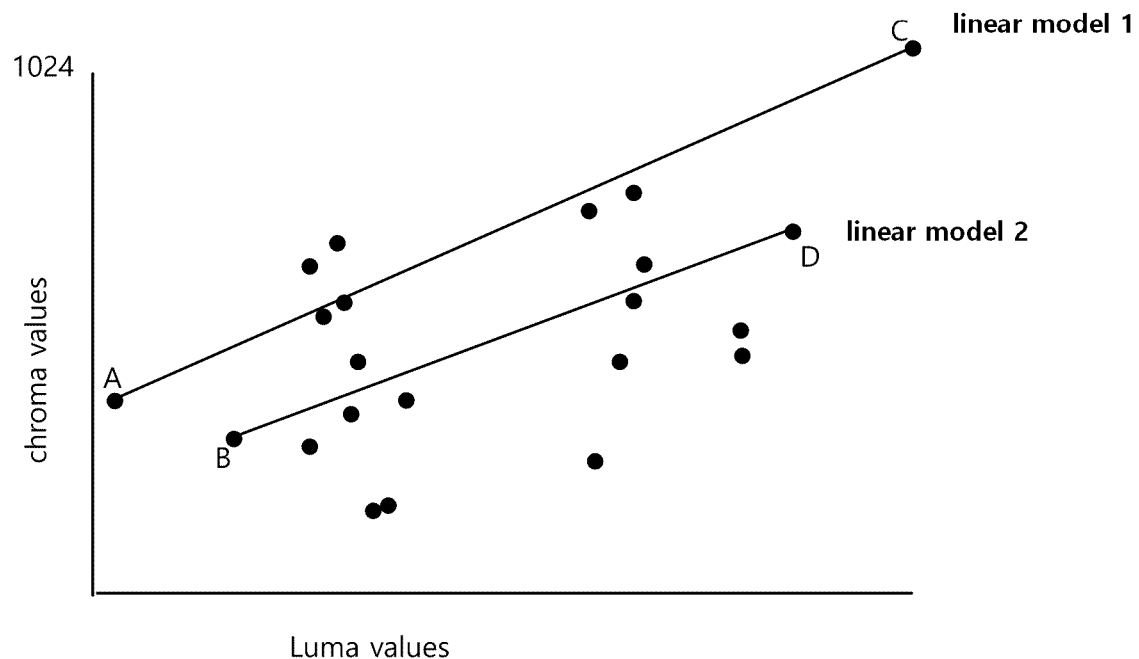
FIG. 12 illustrates a method of determining a linear model of the CCLM according to an embodiment of the present disclosure.

FIG. 12 illustrates a method of determining a linear model of the CCLM according to an embodiment of the present disclosure.

The method of determining the linear model of the CCLM is described. Linear model 1 using a maximum value (C of FIG. 12) and a minimum value (A of FIG. 12) of luma and linear model 2 using a next highest maximum value (D of FIG. 12) and a next lowest minimum value (B of FIG. 12) may be made. Linear model 2 may be replaced with linear model 1. As described above, a linear model may be made and used based on a maximum/minimum value of the characteristic ranking. In FIG. 11 and FIG. 12, the linear model may be made using chroma samples instead of the luma samples.

In addition, in the luma block to which MRL is applied in FIG. 8, when the CCLM is applied, the corresponding luma sample is used as a luma sample required for a linear model. In the case of chroma, when the MRL index is 3, a chroma sample corresponding to the MRL index 0, a chroma sample corresponding to the MRL index 3, and a chroma sample corresponding to an average value/fixed MRL index to which an average value/weight value is applied may be used. Among the chroma prediction methods, a method of using prediction of luma may acquire prediction mode information of luma at a specific location. In this case, the MRL index is also stored like the luma mode. Further, chroma may operate like the prediction using the MRL of luma based on a plurality of reference samples. The MRL index for chroma may be separately signaled. Alternatively, the MRL index of luma may be used.

The mapping relation between luma and chroma for chroma prediction may be configured through Equations (1) to (4) and various linear regression method based on the reconstructed luma and chroma as illustrated in FIGS. 10 to 12. In this case, although the mapping relation between reconstructed right adjacent luma and chroma samples was conventionally used, the mapping relation between luma and chroma for prediction may be derived in consideration of additional adjacent luma and chroma samples according to MRL application. The method may be applied through an increase of the number of samples by adding the adjacent samples added by the MRL to mapping between reconstructed right adjacent luma and chroma samples. Alternatively, respective linear mapping relations may be configured by separately applying separate mapping equations (e.g., Equations (1) to (4)) between the neighboring sample added by MRL and the right adjacent sample to the right adjacent reconstructed luma-chroma samples (e.g., MRL 0) and the reconstructed luma-chroma samples (e.g., MRL 3) added by MRL, and an integrated parameter may be derived by applying an average or a weight value average of parameters such as derived alpha/beta and the like, which may be used as a chroma prediction equation.

Figure 13:
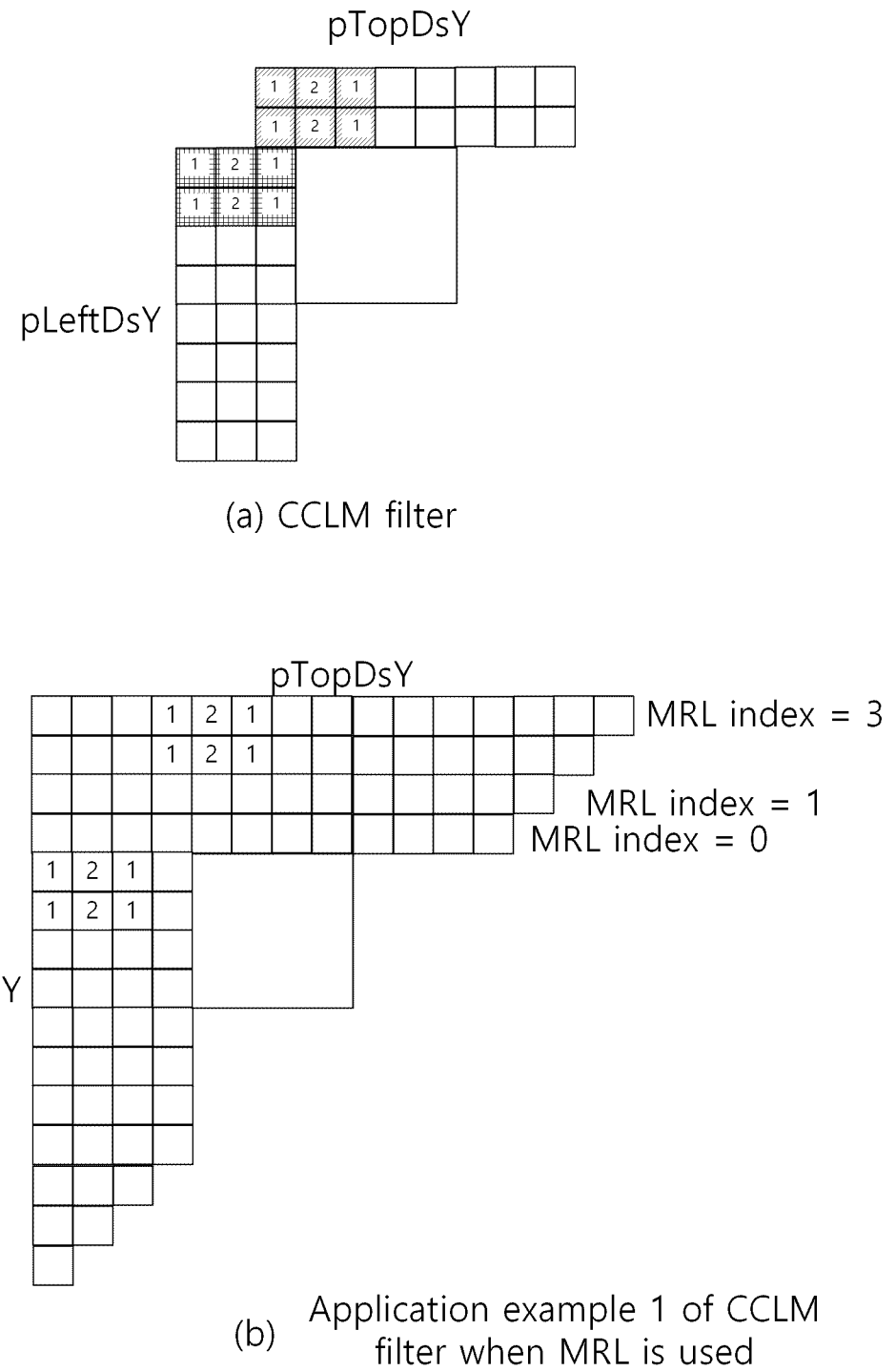
FIG. 13 illustrates an example of a down-sampling filter for luma samples required when chroma intra prediction is performed through the application of the Cross-Component Linear Model (CCLM).

FIG. 13 illustrates an example of a down-sampling filter for luma samples required when chroma intra prediction is performed through the application of a Cross-Component Linear Model (CCLM).

When the encoder or the decoder performs prediction by applying the CCLM to chroma components of a 4×4 predicted block, luma samples should be down-sampled in the form of a 2×2 block of chroma in the case of an image format of 4:2:0. In order to detect the relationship between luma and chroma of a neighboring block of the current block, the encoder or the decoder may down-sample a luma component of the neighboring block, and a process thereof is described below.

The encoder or the decoder may perform a step of acquiring first information (availL) indicating whether a left block adjacent to the current block is available and second information (availT) indicating whether an upper block adjacent to the current block is available.

When the information (availL) indicating whether the left block adjacent to the current block is available indicates that the left block is available, a down-sampled adjacent left luma component pLeftDsY[y] (with y=0 . . . nTbH−1) is derived as follows.

$p$Left$Ds Y[y]$=($p Y[$−1$][2*y]$+$p Y[$−1$][2*y$+1$]$+2$*p Y[$−2$]$
$[2*y]$+2$*p Y[$−2$][2*y$+1$]$+$p Y[$−3$][2*y]$+$p Y[$−3$]$
$[2*y$+1$]$+4)>>3                        Equation (1)

That is, when the first information indicates that the left block is available, the encoder or the decoder may perform a step of acquiring the down-sampled luma component based on the left block.

When the information (availT) indicating whether the upper block adjacent to the current block is available indicates that the upper block is available, a down-sampled adjacent upper luma component pTopDsY[x] (with x=0 . . . nTbH−1) is derived as follows.

$p$Top$Ds Y[x]$=($p Y[$2$*x$−1$][$−2$]$+$p Y[$2$*x$−1$][$−1$]$+2$*p Y$
$[2*x][$−2$]$+2$*p Y[2*x][$−1$]$+$p Y[2*x$+1$][$−2$]$+$p Y$
$[2*x$+1$][$−1$]$+4)>>3                     Equation (2)

That is, when the second information indicates that the upper block is available, the encoder or the decoder may perform a step of acquiring the down-sampled luma component based on the upper block.

If availTL is equal to TRUE, pTopDsY[0] is derived as follows:

$p$Top$Ds Y[$0$]$=($p Y[$−1$][$−2$]$+$p Y[$−1$][$−1$]$+2$*p Y[$0$][$−2$]$+
2$*p Y[$0$][$−1$]$+$p Y[$1$][$−2$]$+$p Y[$1$][$−1$]$+4)>>3   Equation (3)

Further, when the first information indicates that the left block is available and the second information indicates that the upper block is available, the encoder or the decoder may acquire the down-sampled luma component based on both the left block and the upper block.

Otherwise, pTopDsY[0] is derived as follows:

$p$Top$Ds Y[$0$]$=($p Y[$0$][$−2$]$+$p Y[$0$][$−1$]$+1)>>1         Equation (4)

b of FIG. 13 illustrates that different down-sampling filters of the CCLM should be applied to MRL indexes when MRL is applied. When the MRL index is 3, Equation (5) is derived through X-axis movement by −1 in Equation (1).

$$pLeftDsY[y]=(pY[-2][2*y]+pY[-2][2*y+1]+2*pY[-3]\\ [2*y]+2*pY[-3][2*y+1]+pY[-4][2*y]+pY[-4]\\ [2*y+1]+4)>>3 \quad \text{Equation(5)}$$

Equation (6) is derived through Y-axis movement by −1 in Equation (2).

$$pTopDsY[x]=(pY[2*x-1][-4]+pY[2*x-1][-3]+2*pY\\ [2*x][-4]+2*pY[2*x][-3]+pY[2*x+1][-4]+pY\\ [2*x+1][-3]+4)>>3 \quad \text{Equation (6)}$$

Equations (7) and (8) are derived through the application of the same method to Equations (3) and (4).

$$pTopDsY[0]=(pY[-1][-4]+pY[-1][-3]+2*pY[0][-4]+\\ 2*pY[0][-3]+pY[1][-4]+pY[1][-3]+4)>>3 \quad \text{Equation(7)}\\ pTopDsY[0]=(pY[0][-4]+pY[0][-3]+1)>>1 \quad \text{Equation (8)}$$

Figure 14:
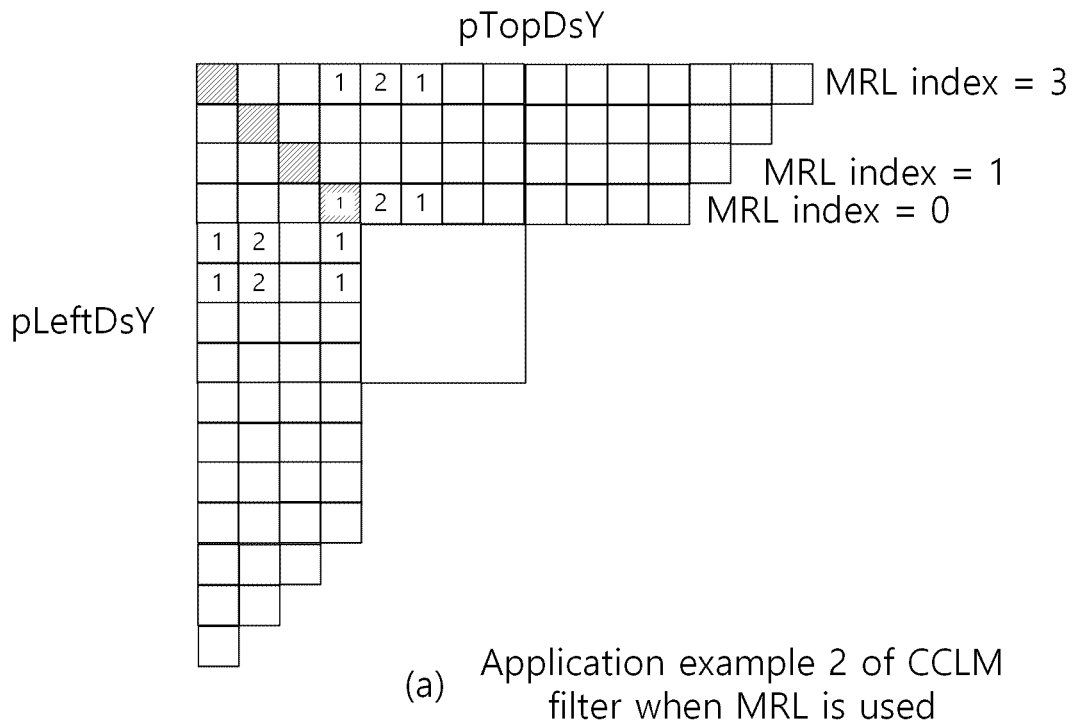
FIG. 14 illustrates an embodiment of applying a CCLM filter when MRL is used.
Figure 14:
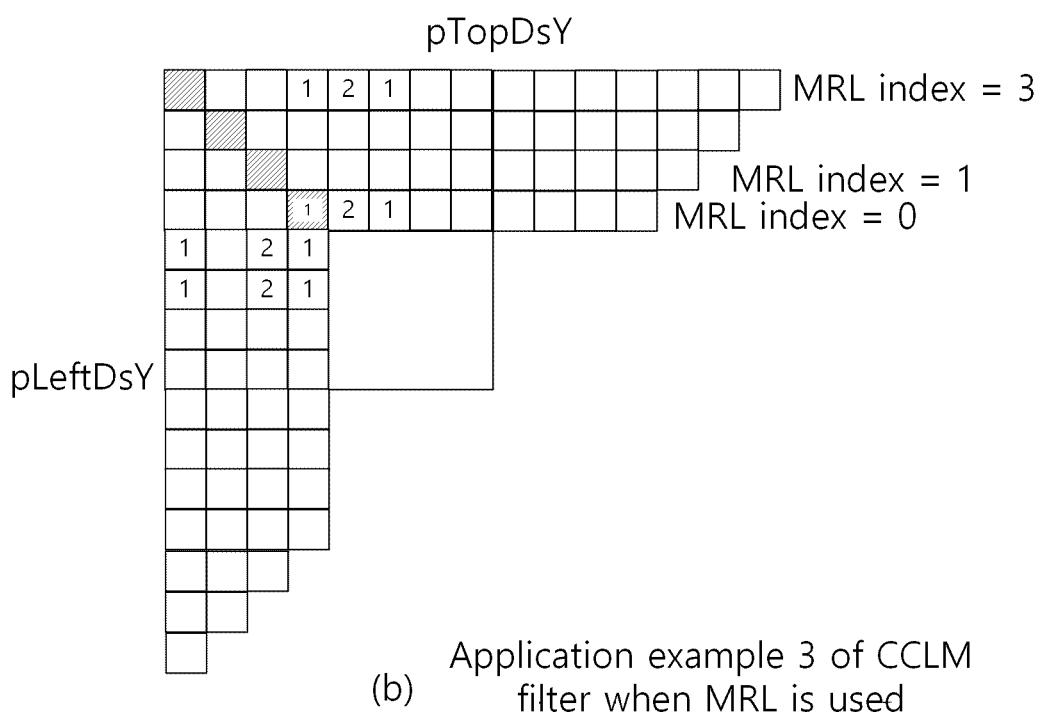

FIG. 14 illustrates an embodiment of applying a CCLM filter when MRL is used.

In order to apply the CCLM filter as illustrated in a of FIG. 14, the encoder and the decoder may change Equations (1), (2), (3), and (4) to Equations (9), (10), (11), and (12) and use that as the down-sampling filter.

$$pLeftDsY[y]=(pY[-1][2*y]+pY[-1][2*y+1]+2*pY[-3]\\ [2*y]+2*pY[-3][2*y+1]+pY[-4][2*y]+pY[-4]\\ [2*y+1]+4)>>3 \quad \text{Equation (9)}$$

$$pTopDsY[x]=(pY[2*x-1][-4]+pY[2*x-1][-1]+2*pY\\ [2*x][-4]+2*pY[2*x][-1]+pY[2*x+1][-4]+pY\\ [2*x+1][-1]+4)>>3 \quad \text{Equation (10)}$$

$$pTopDsY[0]=(pY[-1][-4]+pY[-1][-1]+2*pY[0][-4]+\\ 2*pY[0][-1]+pY[1][-4]+pY[1][-1]+4)>>3 \quad \text{Equation (11)}$$

$$pTopDsY[0]=(pY[0][-4]+pY[0][-1]+1)>>1 \quad \text{Equation (12)}$$

In order to apply the CCLM filter as illustrated in b of FIG. 14, the encoder and the decoder may change Equations (1), (2), (3), and (4) to Equations (13), (14), (15), and (16) and use the down-sampling filter.

$$pLeftDsY[y]=(pY[-1][2*y]+pY[-1][2*y+1]+2*pY[-2]\\ [2*y]+2*pY[-2][2*y+1]+pY[-4][2*y]+pY[-4]\\ [2*y+1]+4)>>3 \quad \text{Equation (13)}$$

Equation (14) is the same as Equation (10).
Equation (15) is the same as Equation (11).
Equation (16) is the same as Equation (12).

Figure 15:
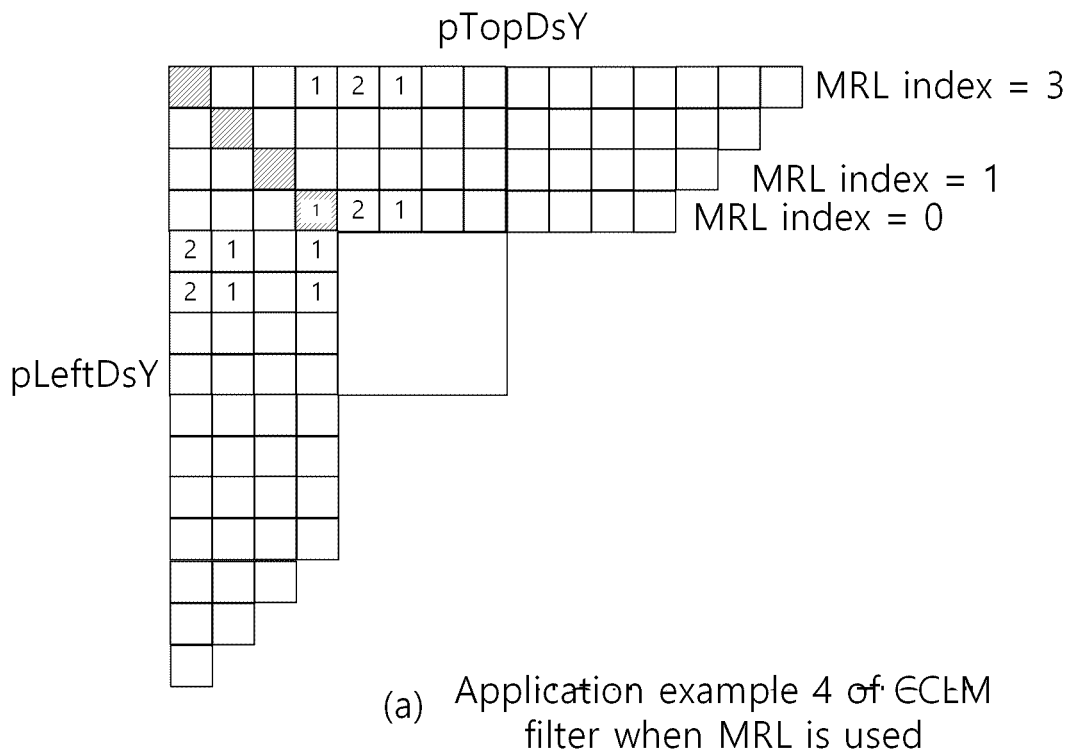
FIG. 15 illustrates an embodiment of applying the CCLM filter when MRL is used.
Figure 15:
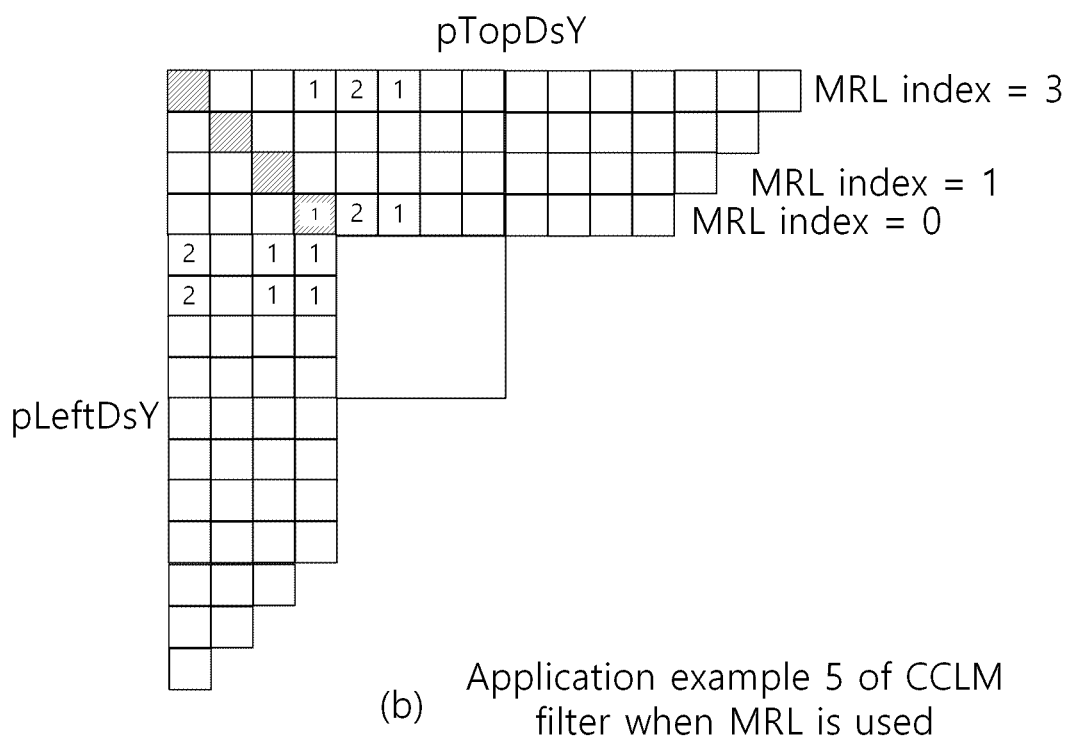

FIG. 15 illustrates an embodiment of applying a CCLM filter when MRL is used.

In order to apply the CCLM filter as illustrated in a of FIG. 15, the encoder and the decoder may change Equations (1), (2), (3), and (4) to Equations (17) to (20) and use the down-sampling filter.

$$pLeftDsY[y]=(pY[-1][2*y]+pY[-1][2*y+1]+pY[-3]\\ [2*y]+pY[-3][2*y+1]+2*pY[-4][2*y]+2*pY[-4]\\ [2*y+1]+4)>>3 \quad \text{Equation (17)}$$

Equation (18) is the same as Equation (10).
Equation (19) is the same as Equation (11).
Equation (20) is the same as Equation (12).

In order to apply the CCLM filter as illustrated in b of FIG. 15, the encoder and the decoder may change Equations (1), (2), (3), and (4) to Equations (21) to (24) and use the down-sampling filter.

$$pLeftDsY[y]=(pY[-1][2*y]+pY[-1][2*y+1]+pY[-2]\\ [2*y]+pY[-2][2*y+1]+2*pY[-4][2*y]+2*pY[-4]\\ [2*y+1]+4)>>3 \quad \text{Equation (21)}$$

Equation (22) is the same as Equation (10).
Equation (23) is the same as Equation (11).
Equation (24) is the same as Equation (12).

The methods correspond to the case in which MRL is one of 0, 1, and 3, that is, MRL index=3, but the conventional filter may be applied when the other MRL indexes, such as 0 and 1 are used. When the MRL index is 2, the conventional filter coefficient may be used and applied using (−1, x-axis samples) and (−3, x-axis samples) in the y axis in the equation applied to the upper side in the conventional method. Further, in the left side, weight values 1, 2, and 1 corresponding to −1, −2, and −3 in the x axis may be changed to 1, 1, and 2, and applied.

Referring back to FIG. 10, the encoder or the decoder finds the minimum value and the maximum value of luma using reconstructed luma and chroma adjacent to the current predicted block, and Equation (1) is induced from Equation (2) and Equation (3) using the two values. Finally, chroma is predicted using a reconstructed luma value of the current block through Equation (4).

When an image format is 4:2:0, a luma sample is adjusted to the number of chroma samples by applying a down-sampling filter. When all of the upper and left reference samples are effective in a of FIG. 13 in order to apply Equation (1) of FIG. 10, a minimum luma value (MinLuma), a maximum luma value (MaxLuma), a chroma value (ChromaForMinLuma) for minimum luma, and a chroma value (ChromaForMaxLuma) for maximum luma should be induced. As described with reference to FIG. 11, the encoder or the decoder may induce a maximum luma average value, a minimum luma average value, a maximum chroma average value, and a minimum chroma average value and apply Equation (1). The minimum luma value (MinLuma) may correspond to the minimum luma average value, the maximum luma value (MaxLuma) may correspond to the maximum luma average value, the chroma value (ChromaForMinLuma) for minimum luma may correspond to the minimum chroma average value, and the chroma value (ChromaForMaxLuma) for maximum luma may correspond to the maximum chroma average value.

In this case, a value first obtained in the upper side is a reference value when left samples are identified, and is compared with the left sample values. After all samples in the upper and left sides are identified, the values of MinLuma, MaxLuma, ChromaForMinLuma, and ChromaForMaxLuma are determined. Pseudo code for deriving MinLuma, MaxLuma, ChromaForMinLuma, and ChromaForMaxLuma is described below.

```
1. The variables MinLuma, MaxLuma, ChromaForMinLuma and
ChromaForMaxLuma are derived as follows:
  - The variable MinLuma is set equal to 1 << (BitDepthY) +1 and the variable
MaxLuma is set equal to -1, 1 << (BitDepthY) +1 is
changed to (1 << BitDepthY) +1.
```

```
    - If availT is equal to TRUE, the variables MinLuma, MaxLuma,
ChromaForMinLuma and ChromaForMaxLuma with
x = 0..nS - 1 are derived as follows:
  - If (MinLuma> pTopDsY[x * xS]), the following applies:
  MinLuma = pTopDsY[x * xS]
  ChromaForMinLuma = p[x *xS][-1]
  - If (MaxC< pTopDsY[x * xS]), the following applies:
  MaxLuma = pTopDsY[x * xS]
  ChromaForMaxLuma = p[x * xS][-1]
    - If availL is equal to TRUE, the variables MinLuma, MaxLuma,
ChromaForMinLuma and ChromaForMaxLuma with
y = 0..nS - 1 are derived as follows:
  -If (MinLuma> pTopDsY[y * yS]), the following applies:
  (MinLuma> pTopDsY[y * yS] is changed to (MinLuma > pLeftDsY[y * yS].
  MinLuma = pTopDsY[y * yS]: MinLuma = pTopDsY[y * yS] is changed to
MinLuma = pLeftDsY[y * yS].
    ChromaForMinLuma = p[-1] [y * yS]
  -If (MaxLuma< pTopDsY[y * yS]), the following applies:
  (MaxLuma< pTopDsY[y * yS] is changed to (MaxLuma < pLeftDsY[y * yS].
  MaxLuma = pTopDsY[y * yS]: MaxLuma = pTopDsY[y * yS] is changed to
MaxLuma = pLeftDsY[y * yS].
    ChromaForMaxLuma = p[-1][y * yS]
```

Figure 16:
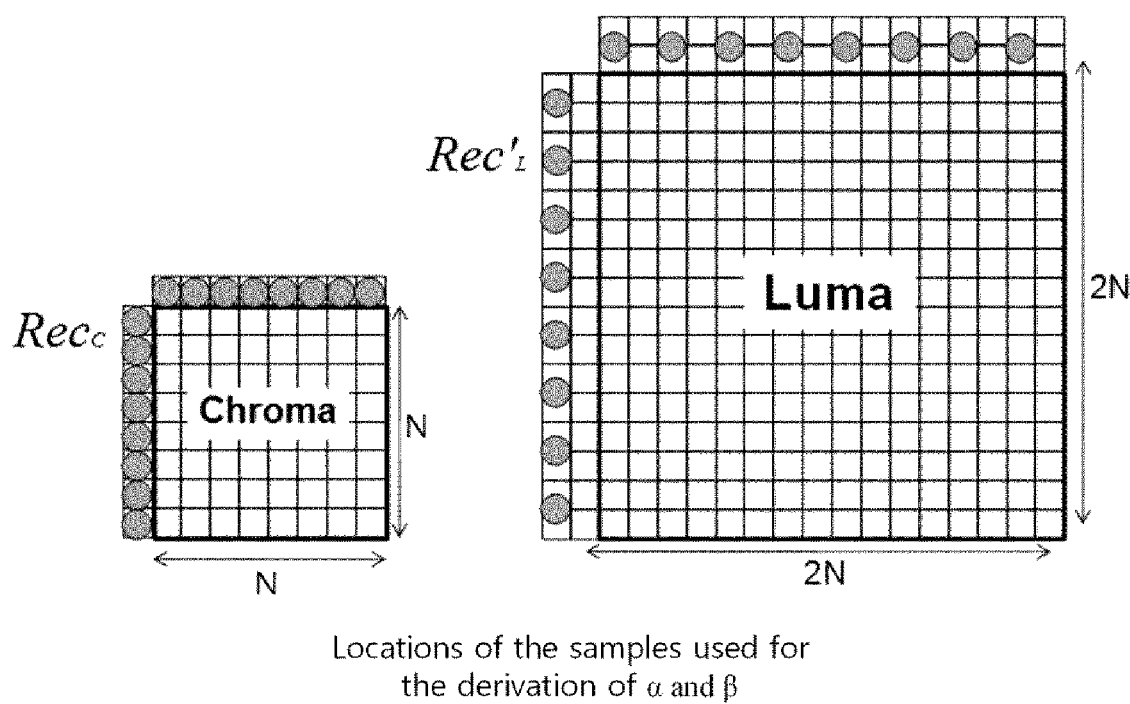
FIG. 16 illustrates a Cross Component Linear Model (CCLM) method according to an embodiment of the present disclosure.

FIG. 16 illustrates a Cross Component Linear Model (CCLM) method according to an embodiment of the present disclosure.

As described with reference to FIG. 10, a minimum value and a maximum value of luma are obtained using reconstructed luma and chroma adjacent to the current predicted block, and Equation (1) is induced from Equation (2) and Equation (3) using the two values. Finally, chroma is predicted using a reconstructed luma value of the current block through Equation (4).

Referring to FIG. 16, when an image format is 4:2:0, the number of luma samples may be larger than the number of chroma samples. Accordingly, the encoder or the decoder may fit the number of luma samples to the number of chroma samples by applying a down-sampling filter to the luma samples. Referring to FIG. 10, when upper and left reference samples are all effective, a minimum luma value (MinLuma), a maximum luma value (MaxLuma), a chroma value (ChromaForMinLuma) for minimum luma, and a chroma value (ChromaForMaxLuma) for maximum luma should be induced. As described with reference to FIG. 11, the encoder or the decoder may induce a maximum luma average value, a minimum luma average value, a maximum chroma average value, and a minimum chroma average value and apply Equation (1). The minimum luma value (MinLuma) may correspond to the minimum luma average value, the maximum luma value (MaxLuma) may correspond to the maximum luma average value, the chroma value (ChromaForMinLuma) for minimum luma may correspond to the minimum chroma average value, and the chroma value (ChromaForMaxLuma) for maximum luma may correspond to the maximum chroma average value.

In this case, a value first obtained in the upper side is a reference value when left samples are identified, and is compared with the left samples. After all samples in the upper and left sides are identified, the values of MinLuma, MaxLuma, ChromaForMinLuma, and ChromaForMaxLuma are determined.

The encoder or the decoder may acquire MinLuma, MaxLuma, ChromaForMinLuma, and ChromaForMaxLuma through pseudo code below.

The variables MinLuma, MaxLuma, ChromaForMinLuma and ChromaForMaxLuma are derived as follows:

```
       The variable MinLuma is set equal to 1 << (BitDepthY) +1 and the variable
    MaxLuma is set equal to -1, 1 << (BitDepthY) +1 is
    changed to (1 << BitDepthY) +1.
     If availT is equal to TRUE, the variables MinLuma, MaxLuma,
    ChromaForMinLuma and ChromaForMaxLuma with
    x = 0..nS - 1 are derived as follows:
     If (MinLuma> pTopDsY[x * xS]), the following applies:
     MinLuma = pTopDsY[x * xS]
     ChromaForMinLuma = p[x *xS][-1]
     If (MaxC< pTopDsY[x * xS]), the following applies:
     MaxLuma = pTopDsY[x * xS]
     ChromaForMaxLuma = p[x * xS][-1]
     If availL is equal to TRUE, the variables MinLuma, MaxLuma,
    ChromaForMinLuma and ChromaForMaxLuma with
    y = 0..nS- 1 are derived as follows:
     If (MinLuma> pTopDsY[y * yS]), the following applies:
     MinLuma = pLeftDsY[y * yS]
     ChromaForMinLuma = p[-1] [y * yS]
     If (MaxLuma< pTopDsY[y * yS]), the following applies:
     MaxLuma = pLeftDsY[y * yS]
     ChromaForMaxLuma = p[-1][y * yS]
```

Figure 17:
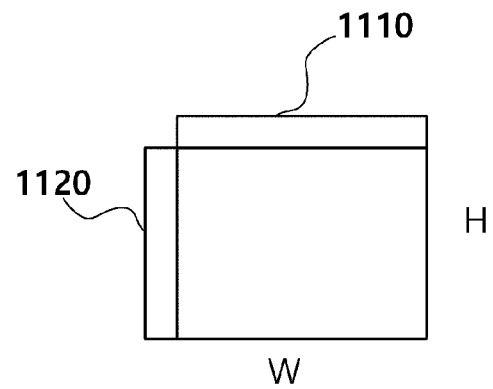
FIG. 17 illustrates methods of determining the number of reference samples in the CCLM method according to an embodiment of the present disclosure.
Figure 17:
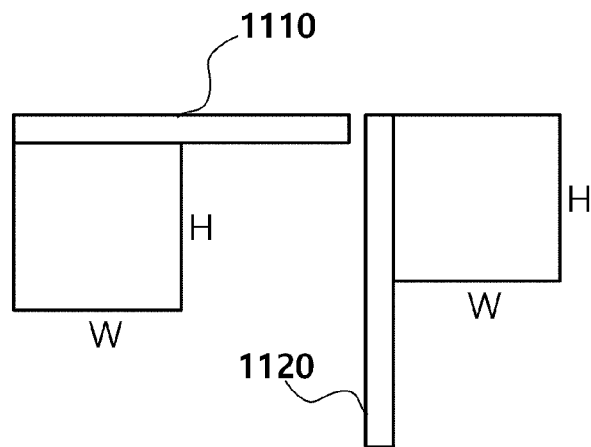
Figure 17:
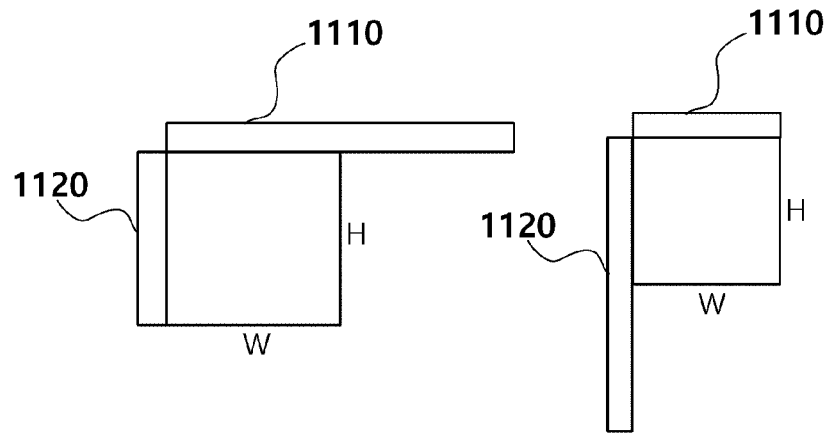

FIG. 17 illustrates methods of determining the number of reference samples in the CCLM method according to an embodiment of the present disclosure.

Referring to A of FIG. 17, in the case of a block which is not a square block in the conventional CCLM, the encoder or the decoder uses samples corresponding to the number of short sides as the reference samples in the long side. Instead of the method, the encoder or the decoder may use all samples of the long side as the reference samples in the long side. The encoder or the decoder may apply the method of FIG. 17 using all of the down-sampled reference samples.

Referring to B of FIG. 17, when the chroma block size is W×H, the encoder or the decoder may use only some of the samples, that is, some of the 2 W samples (left figure) and 2H samples (right figure) rather than all of them as CCLM reference samples.

For example, the encoder or the decoder may acquire the down-sampled luma component based on pixels (samples) included in at least one of the left block or the upper block adjacent to the current block.

Further, referring to FIG. 17, the encoder or the decoder may acquire the down-sampled luma component based on samples included in at least one of rightmost samples 1120 of the left block or lowermost samples 1110 of the upper block. The encoder or the decoder may acquire the down-sampled luma component based on some of the rightmost samples 1120 of the left block or the lowermost samples 1110 of the upper block.

The number of some samples may be ½ or ¼ of the total number of samples 1110 and 1120. In this case, when half samples are configured, samples located at regular intervals may be used. Alternatively, the application is made only in blocks having a predetermined size or larger. That is, the encoder or the decoder may acquire the down-sampled luma component based on samples selected at regular intervals from among the rightmost samples of the left block or the lowermost samples of the upper block.

A length of the side of the current block to which the CCLM is applied may be one of 16, 32, 62, and 128. For example, when the sample included in the upper block is used and the width of the current block is 32 samples or larger, the CCLM may be applied. When the sample included in the left block is used and the height of the current block is 32 or larger, the CCLM may be applied.

In C of FIG. 17, when the chroma block size is W×H, the encoder or the decoder may calculate α and β defined in the CCLM using all of the 2 W+H samples which are CCLM reference samples. Alternatively, the encoder or the decoder may calculate α and β by using all samples in the short side and only samples corresponding to those of the short side in the long side.

In this case, the encoder or the decoder may use only samples at regular intervals.

FIG. 18 illustrates prediction mode signaling for chroma intra prediction according to an embodiment of the present disclosure.

When a variable sps_cclm_enabled_flag is equal to 1, modes related to the CCLM may operate. The number of modes may be three. [Table 1] and [Table 2] of FIG. 18 show intra_chroma_pred_mode indicating the chroma intra prediction mode.

[Table 1] may show the chroma mode based on index information 0 to 7. Information in [Table 1] may show values in the form of binarization before encoding input like information in [Table 2] and, in this case, an amount of information thereof may vary depending on each use mode. For example, a frequently used mode has a high priority and a small amount of information.

In [Table 2], the case in which the value is 4 may correspond to the CCLM, the case in which the value is 5 may correspond to MDLM_L mode, and the case in which the value is 6 may correspond to MDLM_T. When the value of intra_chroma_pred_mode is 5 or 6, encoding efficiency may become better according to the order if the encoder or the decoder uses context modeling. Accordingly, the encoder or the decoder may give a higher priority to MDLM_T than MDLM_L in [Table 2]. Alternatively, the priority may be determined based on the size of chroma of the current predicted block. MDLM_T may have a higher priority than MDLM_L in the case of W (width)>H (Height), and MDLM_L may have a higher priority than MDLM_T in the case of W<H. MDLM_T may be CCLM mode using only upper samples as illustrated in the left figure of (b) of FIG. 17, and MDLM_L may be one of CCLM modes using only left samples as illustrated in the right figure of B of FIG. 17.

Some of the present disclosure has been described in an aspect of the decoder, but may be identically operated in the encoder. For example, an encoding apparatus including a processor and a memory may perform steps of down-sampling reconstructed luma components of a block adjacent to a current block, acquiring a maximum luma value among the down-sampled luma components, based on a first index, acquiring a next highest luma value among the down-sampled luma components, based on a second index, acquiring a maximum luma average value, based on an average value of the maximum luma value and the next highest luma value, acquiring a next lowest luma value among the down-sampled luma components, based on a third index, acquiring a minimum luma value among the down-sampled luma components, based on a fourth index, acquiring a minimum luma average value, based on the next lowest luma value and the minimum luma value, acquiring a first chroma value among chroma components corresponding to the down-sampled luma components, based on the first index, acquiring a second chroma value among the chroma components, based on the second index, acquiring a maximum chroma average value, based on an average value of the first chroma value and the second chroma value, acquiring a third chroma value among the chroma components, based on the third index, acquiring a fourth chroma value among the chroma components, based on the fourth index, acquiring a minimum chroma average value, based on an average value of the third chroma value and the fourth chroma value, acquiring elements of a function indicating a corresponding relation between luma and chroma, based on the maximum luma average value, the minimum luma average value, the maximum chroma average value, and the minimum chroma average value, and predicting a chroma value of the current block by applying a reconstructed luma value of the current block to the function.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A method of processing a video signal, the method comprising:
   acquiring first information indicating whether a left luma block adjacent to a current luma block is available and second information indicating whether an upper luma block adjacent to the current luma block is available;
   down-sampling luma samples of at least one luma block adjacent to the current luma block, wherein the down-sampled luma samples are acquired based on the left luma block when the first information indicates that the left luma block is available and the down-sampled luma samples are acquired based on the upper luma block when the second information indicates that the upper luma block is available;
   acquiring a maximum luma average value, based on a maximum luma value and a next highest luma value of the down-sampled luma samples, wherein the maximum luma value is acquired based on a first index and the next highest luma value is acquired based on a second index;
   acquiring a minimum luma average value, based on a minimum luma value and a next lowest luma value of the down-sampled luma samples, wherein the next lowest luma value is acquired based on a third index and the minimum luma value is acquired based on a fourth index;
   acquiring a maximum chroma average value, based on a first chroma value and a second chroma value of chroma samples corresponding to the down-sampled luma samples, wherein the first chroma value is acquired based on the first index and the second chroma value is acquired based on the second index;
   acquiring a minimum chroma average value, based on a third chroma value and a fourth chroma value of the chroma samples, wherein the third chroma value is acquired based on the third index and the fourth chroma value is acquired based on the fourth index;
   acquiring one or more elements of an equation for acquiring a predicted chroma sample based on a luma sample, based on the maximum luma average value, the minimum luma average value, the maximum chroma average value, and the minimum chroma average value; and
   acquiring the predicted chroma sample of a current chroma block by applying a down-sampled luma sample of the current luma block and the one or more elements to the equation.

2. The method of claim 1, wherein the acquiring the one or more elements of the equation comprises:
   acquiring a first differential value based on a first difference between the maximum luma average value and the minimum luma average value;
   acquiring a second differential value based on a second difference between the maximum chroma average value and the minimum chroma average value;
   acquiring a first element ($\alpha$) related to a ratio of the second differential value and the first differential value; and
   acquiring a second element ($\beta$), based on the first element, the minimum luma average value, and the minimum chroma average value,
   wherein acquiring the predicted chroma sample of the current chroma block comprises acquiring the predicted chroma sample of the current chroma block, based on the down-sampled luma sample of the current luma block, the first element ($\alpha$), and the second element ($\beta$).

3. The method of claim 2, further comprising down-sampling luma samples of the current luma block,
   wherein acquiring the predicted chroma sample of the current chroma block comprises:
   acquiring the predicted chroma sample of the current chroma block, based on the equation of (the predicted chroma sample of the current chroma block)=(((the down-sampled luma sample value of the current luma block)*$\alpha$)>>S)+$\beta$, S being a constant.

4. The method of claim 1, wherein the down-sampled luma samples are acquired based on samples included in at least one of the left luma block or the upper luma block adjacent to the current luma block.

5. The method of claim 4, wherein the down-sampled luma samples are acquired based on samples included in at least one of rightmost samples of the left luma block or lowermost samples of the upper luma block.

6. The method of claim 5, wherein the down-sampled luma samples are acquired based on samples selected at regular intervals from among the at least one of rightmost samples of the left luma block or the lowermost samples of the upper luma block.

7. A method of encoding a video signal, the method comprising:
   acquiring first information indicating whether a left luma block adjacent to a current luma block is available and second information indicating whether an upper luma block adjacent to the current luma block is available;

down-sampling luma samples of at least one luma block adjacent to the current luma block, wherein the down-sampled luma samples are acquired based on the left luma block when the first information indicates that the left luma block is available and the down-sampled luma samples are acquired based on the upper luma block when the second information indicates that the upper luma block is available;

acquiring a maximum luma average value, based on a maximum luma value and a next highest luma value of the down-sampled luma samples, wherein the maximum luma value is acquired based on a first index and the next highest luma value is acquired based on a second index;

acquiring a minimum luma average value, based on a minimum luma value and a next lowest luma value of the down-sampled luma samples, wherein the next lowest luma value is acquired based on a third index and the minimum luma value is acquired based on a fourth index;

acquiring a maximum chroma average value, based on a first chroma value and a second chroma value of chroma samples corresponding to the down-sampled luma samples, wherein the first chroma value is acquired based on the first index and the second chroma value is acquired based on the second index;

acquiring a minimum chroma average value, based on a third chroma value and a fourth chroma value of the chroma samples, wherein the third chroma value is acquired based on the third index and the fourth chroma value is acquired based on the fourth index;

acquiring one or more elements of an equation for acquiring a predicted chroma sample based on a luma sample, based on the maximum luma average value, the minimum luma average value, the maximum chroma average value, and the minimum chroma average value; and acquiring the predicted chroma sample of a current chroma block by applying a down-sampled luma sample of the current luma block and the one or more elements to the equation.

8. A non-transitory computer-readable medium storing a bitstream, the bitstream being decoded by a decoding method, wherein the decoding method comprises:

acquiring first information indicating whether a left luma block adjacent to a current luma block is available and second information indicating whether an upper luma block adjacent to the current luma block is available;

down-sampling luma samples of at least one luma block adjacent to the current luma block, wherein the down-sampled luma samples are acquired based on the left luma block when the first information indicates that the left luma block is available and the down-sampled luma samples are acquired based on the upper luma block when the second information indicates that the upper luma block is available;

acquiring a maximum luma average value, based on a maximum luma value and a next highest luma value of the down-sampled luma samples, wherein the maximum luma value is acquired based on a first index and the next highest luma value is acquired based on a second index;

acquiring a minimum luma average value, based on a minimum luma value and a next lowest luma value of the down-sampled luma samples, wherein the next lowest luma value is acquired based on a third index and the minimum luma value is acquired based on a fourth index;

acquiring a maximum chroma average value, based on a first chroma value and a second chroma value of chroma samples corresponding to the down-sampled luma samples, wherein the first chroma value is acquired based on the first index and the second chroma value is acquired based on the second index;

acquiring a minimum chroma average value, based on a third chroma value and a fourth chroma value of the chroma samples, wherein the third chroma value is acquired based on the third index and the fourth chroma value is acquired based on the fourth index;

acquiring one or more elements of an equation for acquiring a predicted chroma sample based on a luma sample, based on the maximum luma average value, the minimum luma average value, the maximum chroma average value, and the minimum chroma average value; and acquiring the predicted chroma sample of a current chroma block by applying a down-sampled luma sample of the current luma block and the one or more elements to the equation.

* * * * *